US009215276B2

(12) United States Patent
Gillo et al.

(10) Patent No.: US 9,215,276 B2
(45) Date of Patent: Dec. 15, 2015

(54) APPARATUS AND METHOD OF DATA TRANSFER

(75) Inventors: Tomas Owen Gillo, London (GB); Scott Christopher Waugaman, San Francisco, CA (US); Mitchell Goodwin, London (GB)

(73) Assignee: Sony Computer Entertainment Europe Limited (GB)

( * ) Notice: Subject to any disclaimer, the term of this patent is extended or adjusted under 35 U.S.C. 154(b) by 1154 days.

(21) Appl. No.: 12/663,066

(22) PCT Filed: Jun. 3, 2008

(86) PCT No.: PCT/GB2008/001888
§ 371 (c)(1),
(2), (4) Date: Oct. 6, 2010

(87) PCT Pub. No.: WO2008/149076
PCT Pub. Date: Dec. 11, 2008

(65) Prior Publication Data
US 2011/0055320 A1 Mar. 3, 2011

(30) Foreign Application Priority Data
Jun. 4, 2007 (GB) .................................. 0710649.5

(51) Int. Cl.
*G06F 15/16* (2006.01)
*G06F 15/173* (2006.01)
(Continued)

(52) U.S. Cl.
CPC .......... *H04L 67/104* (2013.01); *H04L 67/1046* (2013.01); *H04L 67/38* (2013.01); *A63F 2300/402* (2013.01); *A63F 2300/404* (2013.01);
(Continued)

(58) Field of Classification Search
USPC ........................................................ 709/204
See application file for complete search history.

(56) References Cited

U.S. PATENT DOCUMENTS 6,508,709 B1 * 1/2003 Karmarkar ...................... 463/42
6,779,004 B1 * 8/2004 Zintel ............................ 709/227
(Continued)

FOREIGN PATENT DOCUMENTS

EP 1519531 A2 3/2005
EP 1615403 A1 1/2006
(Continued)

OTHER PUBLICATIONS

Lua, Eng Keong et al. "A Survey and Comparison of Peer to Peer Overlay Network Schemes," IEEE Communications Surveys, vol. 7, No. 2, Second Quarter 2005, p. 72.*
(Continued)

*Primary Examiner* — Melvin H Pollack
(74) *Attorney, Agent, or Firm* — Lerner, David, Littenberg, Krumholz & Mentlik, LLP

(57) ABSTRACT

A data transfer system comprises a server and a plurality of devices each operable as a client of the server. The server in turn comprises a notification arrangement to notify a device that it is to become a member of a peer group comprising other clients of the server. The server further comprises a client/server data transmitter to send data to the respective device upon such notification. Each device in turn comprises a client/server data receiver to receive respective data from the server, and a peer-to-peer communicator to send respective data received from the server to one or more peers, and to receive from one or more peers respective data that was sent to it or them by the server.

30 Claims, 16 Drawing Sheets

(51) Int. Cl.
*H04L 29/08* (2006.01)
*H04L 29/06* (2006.01)

(52) U.S. Cl.
CPC ..... *A63F 2300/408* (2013.01); *A63F 2300/513* (2013.01); *A63F 2300/534* (2013.01); *A63F 2300/552* (2013.01)

(56) References Cited

U.S. PATENT DOCUMENTS

| | | | |
|---|---|---|---|
| 7,152,092 B2* | 12/2006 | Beams et al. | 709/204 |
| 7,269,632 B2* | 9/2007 | Edeker et al. | 709/217 |
| 7,590,696 B1* | 9/2009 | Odell et al. | 709/206 |
| 7,627,632 B2* | 12/2009 | Douceur et al. | 709/205 |
| 7,660,864 B2* | 2/2010 | Markki et al. | 709/207 |
| 7,677,979 B2* | 3/2010 | Van Luchene | 463/42 |
| 7,686,693 B2* | 3/2010 | Danieli et al. | 463/42 |
| 7,695,370 B2* | 4/2010 | Liu et al. | 463/42 |
| 7,729,376 B2* | 6/2010 | Klausberger et al. | 370/468 |
| 7,734,751 B2* | 6/2010 | Donescu et al. | 709/223 |
| 7,774,495 B2* | 8/2010 | Pabla et al. | 709/238 |
| 7,780,526 B2* | 8/2010 | Nguyen et al. | 463/29 |
| 7,783,698 B2* | 8/2010 | Jain | 709/203 |
| 7,788,522 B1* | 8/2010 | Abdelaziz et al. | 714/4.1 |
| 7,865,811 B2* | 1/2011 | Alstrup et al. | 714/784 |
| 7,970,922 B2* | 6/2011 | Svendsen | 709/231 |
| 8,000,328 B1* | 8/2011 | Kandekar et al. | 370/392 |
| 8,050,272 B2* | 11/2011 | Chaturvedi et al. | 370/395.2 |
| 8,070,604 B2* | 12/2011 | Amaitis et al. | 463/42 |
| 8,176,189 B2* | 5/2012 | Traversat et al. | 709/230 |
| 8,200,775 B2* | 6/2012 | Moore | 709/217 |
| 8,204,992 B2* | 6/2012 | Arora et al. | 709/226 |
| 8,214,489 B2* | 7/2012 | Ballette et al. | 709/224 |
| 8,249,638 B2* | 8/2012 | Lor | 455/518 |
| 8,549,095 B2* | 10/2013 | Moore et al. | 709/213 |
| 8,606,846 B2* | 12/2013 | Czechowski et al. | 709/203 |
| 8,755,392 B2* | 6/2014 | Traversat et al. | 370/400 |
| 8,832,290 B2* | 9/2014 | Li et al. | 709/231 |
| 2003/0177187 A1* | 9/2003 | Levine et al. | 709/205 |
| 2003/0208595 A1* | 11/2003 | Gouge et al. | 709/225 |
| 2003/0212804 A1 | 11/2003 | Hashemi | |
| 2003/0217158 A1 | 11/2003 | Datta | |
| 2004/0003039 A1 | 1/2004 | Humphrey et al. | |
| 2004/0210634 A1* | 10/2004 | Ferrer et al. | 709/204 |
| 2007/0094325 A1* | 4/2007 | Ih et al. | 709/203 |
| 2007/0130283 A1* | 6/2007 | Klein et al. | 709/217 |
| 2007/0233879 A1* | 10/2007 | Woods et al. | 709/227 |
| 2008/0004119 A1* | 1/2008 | Van Luchene et al. | 463/42 |
| 2008/0214287 A1* | 9/2008 | Lutnick et al. | 463/25 |
| 2010/0057915 A1* | 3/2010 | Dorn et al. | 709/226 |
| 2010/0189259 A1* | 7/2010 | Kaler | 380/255 |
| 2010/0281165 A1* | 11/2010 | Gerdes et al. | 709/226 |
| 2012/0311139 A1* | 12/2012 | Brave et al. | 709/224 |
| 2014/0187316 A1* | 7/2014 | Harris et al. | 463/29 |

FOREIGN PATENT DOCUMENTS

| | | |
|---|---|---|
| EP | 1633112 A1 | 3/2006 |
| EP | 1832953 A2 | 9/2007 |
| GB | 2420257 A | 5/2006 |
| JP | 2001236291 A | 8/2001 |
| JP | 2003067317 A | 3/2003 |
| JP | 2006074744 A | 3/2006 |
| JP | 2006221423 A | 8/2006 |
| JP | 2009510561 A | 3/2009 |
| WO | 03/085559 A1 | 10/2003 |
| WO | 2004/063840 A2 | 7/2004 |
| WO | 2007040810 A2 | 4/2007 |

OTHER PUBLICATIONS

Examination Report from Corresponding Application GB 0710649, dated Sep. 5, 2008.
Combined Search and Examination Report from Corresponding Application GB 0710649, dated Sep. 14, 2007.
International Search Report, PCT/GB2008/001888, dated Dec. 29, 2008.
Stutzbach D et al: "The scalability of swarming peer-to-peer content delivery" Networking 2005. Networking Technologies, Services, and Protocols; Performance of Computer and Communication Networks; Mobile and Wireless Communication Systems. 4th International IFIP-TC6 Networking Conference. Proceedings May 2-6, 2005 Waterloo,, vol. 4th, May 2, 2005, pp. 15-26, XP009100830 ISBN: 978-3-540-25809-4.
Steed A et al: Supporting scalable peer to peer virtual environments using frontier sets Virtual Reality, 2005. Proceedings. VR 2005. IEEE Bonn, Germany Mar. 12-16, 2005, Piscataway, NJ, USA,IEEE, Jan. 1, 2005, pp. 27-34, XPO3 1173566 ISBN: 978-0-7803-8929-8.
Bauer D et al: "Consumer communications and networking series A federated peer-to-peer network game architecture" IEEE Communications Magazine, IEEE Service Center, Piscataway, US, vol. 42, No. 5, May 1, 2004, pp. 114-122, XP011112997 ISSN: 0163-6804.
Jin Li Ed—Zhang X H et al: PeerStreaming: An On-Demand Peer-to-Peer Media Streaming Solution Based on a Receiver-Driven Streaming Protocol Multimedia Signal Processing, 2005 IEEE 7th Workshop On, IEEE, p. 1, Oct. 1, 2005, pp. 1-4, X P031018253 ISBN: 978-0-7803-9288-5.
Nguyen T et al: "Multiple Sender 19,29, Distributed Video Streaming".IEEE Transactions on Multimedia, IEEE 39,41 Service Center, Piscataway, NJ, US, vol. 6, No. 2, Apr. 1, 2004, pp. 315-326, XP011109142 ISSN: 1520-9210.
Gnutella, http://en.wikipedia.org/wiki/Gnutella.
http://www.bittornado.com/docs.webseed-spec.txt.
http://video-games.elliottback.com/2005/11/26/world-of-warcraft-torrent-updater/.
Examination Report from Corresponding Application GB 0710649, dated Oct. 24, 2011.
Japanese Office Action for 2010-510868 dated Mar. 8, 2012.

* cited by examiner

APPARATUS AND METHOD OF DATA TRANSFER

CROSS REFERENCE TO RELATED APPLICATIONS

The present application is a national phase entry under 35 U.S.C. §371 of International Application No. PCT/GB2008/001888, filed Jun. 3, 2008, published in English, which claims the benefit of GB Patent Application No. 0710649.5, filed Jun. 4, 2007. The entire disclosures of each of the above-identified applications are incorporated by reference herein.

The present invention relates to an apparatus and method of data transfer.

On the Internet, the predominant data transfer model is the client-server model, where the client (typically a home computer linked to the internet) requests data from a server. The server will either contain cached versions of popular data files, or will relay a client request to the ultimate data source to form a chain of client/server links from sender to recipient. However this means that for popular data, the server is a potential bottleneck; and for large downloads the client is also at risk of disconnection from or problems with the server.

An alternative model is peer-to-peer file transfer, such as that provided by Gnutella (e.g. see http://en.wikipedia.org/wiki/Gnutella). In this model, each peer device (again, typically a home computer) running the Gnutella software can be queried for its shareable contents. Thus a peer can poll other peers to find the desired file and, once found, the data can be transferred directly between peers. If the transfer fails for any reason, another peer may be found and transfer resumed. However, this model also suffers from problems; firstly, thousands of peers polling each other can cause a considerable overhead within the peer network. Secondly, broadband systems typically have asymmetric upload and download speeds; thus whilst a home computer may be able to download at, say 8 Mbit/sec, it may only be able to upload at 500 Kbit/sec. Whilst this is not an issue for the client/server download model, for peer-to-peer it means that the effective download speed is limited by the peer device's upload speed. Finally there is a problem with abuse, where people download files but then disconnect so that they will not act as a source for anyone else, thereby limiting the effective bandwidth of the peer network.

These problems have been mitigated by a further peer model typified by BitTorrent®. In a BitTorrent system, the polling task is handled by a central server called a tracker, thereby reducing the polling overhead. The tracker identifies which peer devices contain some or all of the data desired by the requesting device. At least one device (called the 'seed') must contain all the data.

The tracker then instructs these peer devices to send complementary parts of the data to the requesting device. By receiving non-overlapping parts of the data from multiple sources simultaneously, the asymmetry of upload and download rates between peers is also mitigated. As the requesting device accumulates the data, it also becomes part of the peer group able to simultaneously upload to other requesting devices (for example, some of the peers from which it is currently downloading other, different parts of the data). Typically the data order is random, although a so-called 'rarest first' strategy can be implemented to quickly counteract bottlenecks within the group of peer devices.

BitTorrent also implements a so-called tit-for-tat system to discourage abuse; the effective download speed that a requesting device can obtain is made dependent upon its upload history to other requesting devices; thus to get the best download performance it is necessary to co-operate within the peer network.

Variations on the BitTorrent model include making a partial return to the original peer-to-peer model by removing the tracker, and requiring devices to poll other peers directly (so-called 'trackerless torrents'). Other proposed variations include 'Web seeding'; this is intended to relieve bandwidth demands on a website by using BitTorrent to download a file hosted (seeded) by the website—see 'http://www.bittornado.com/docs/webseed-spec.txt'.

The BitTorrent approach has also been incorporated into other software. For example, the popular online game 'World of Warcraft' uses a BitTorrent style system to distribute upgrades (see http://video-games.elliottback.com/2005/11/26/world-of-warcraft-torrent-updater/).

However, different content distribution scenarios may benefit from other data transfer models, and so there is scope for further alternatives to be developed.

The present invention discloses such an alternative data transfer model.

In a first aspect of the present invention, a data transfer system comprises a server and a plurality of devices each operable as a client of the server and as a peer-to-peer device. The server comprises notification means to notify the plurality of devices that they are to form a peer group, and a client/server data transmission means to send data to the respective devices upon such notification. Each device comprises client/server data reception means to receive respective data from the server, and peer-to-peer communication means to send respective data received from the server to one or more peers, and to receive from one or more peers respective data that was sent to it or them by the server.

In another aspect of the present invention, a method of data transmission between a server and a plurality of client devices comprises the steps of the server notifying a plurality of client devices that they are to form a peer-group of client devices, the server transmitting data to a first client device, the first client device transmitting data it receives from the server to other client devices in the peer group in a peer-to-peer fashion, and the first client device respectively receiving from other client devices in the peer group in a peer-to-peer fashion data that each respective client device in the peer group has received from the server.

Advantageously therefore, the system and method of the above aspects allow a server to supplement its own transfers to a plurality of devices by recruiting such devices into a peer group and sending some of the data to each peer for distribution within the group. In this way, each device can obtain all the data, whilst no one device receives all of its data from the server alone.

In another aspect of the present invention, a data transfer system comprises a server, a plurality of devices each operable as a client of the server and as a peer-to-peer device, and operable to form a peer-to-peer group. The server comprises request reception means to receive a request for data from a further device acting as a client device, a notification arrangement to notify the plurality of devices and the further device that they are to form a peer group, and a client/server data transmission means to send data to the further device. The further device comprises client/server data reception means to receive data from the server, and peer-to-peer communication means to receive data from one or more peers in a peer group. The server and one or more peers are arranged to transmit the requested data to the further device in parallel in a complementary fashion until a complete set of data is obtained by the further device, the respective proportions of data being received by the further device from the server and the one or more peers being a consequence of their respective data transfer rates.

In another aspect, a method of data transmission to a further device from a server and a plurality of devices forming peer group comprises the steps of the server receiving a request for data from the further device, the server notifying the plurality of devices and the further device that they are to form a peer group; the server transmitting data to the further device, one or more other devices of the peer group receiving a request to transmit the data to the further device, and the one or more other devices of the peer group transmitting data to the further device; and in which the server and one or more other devices of the peer group transmit the requested data to the further device in parallel in a complementary fashion until a complete set of data is obtained by the further device, the respective proportions of data being received by the further device from the server and the one or more peers being a consequence of their respective data transfer rates.

Advantageously, the system and method of the above two aspects allow a server to supplement its own transfers to a single device by recruiting into a peer group devices that in their totality already comprise all the data required for transfer. The server and peer group then both transmit their data to the single device in a complementary manner such that the single device is able to take advantage of whichever download mechanism is running faster, rather than, for example, allocating 50% to each method and then waiting for the slower method to complete its share.

Further respective aspects and features of the invention are defined in the appended claims.

Embodiments of the present invention will now be described by way of example with reference to the accompanying drawings, in which.

In a summary embodiment of the present invention, a plurality of entertainment devices (sometimes referred to as 'games consoles') are connected to a server running an on-line virtual environment. Within the virtual environment, respective users of these entertainment devices are represented by avatars (e.g. graphical representations of the users), and each user's view of the virtual environment is responsive to the location of their avatar within that environment. In the virtual environment are devices such as televisions and cinema screens enabling the display of streaming media such as adverts and movie trailers, and potentially zones where additional functionality may be available for download. If only one avatar corresponding to an entertainment device is positioned so as to allow viewing of such streamed content, then this will be streamed from a central server. However, where two or more avatars are positioned so as to view such streamed content, respective elements of the content are streamed from the server to each entertainment device, which then share these elements with the other entertainment devices corresponding to the other avatars. Thus, peer membership and content is controlled by the server, with membership being dependent upon the behaviour of a device's avatar. In this way the bandwidth used by the server is less than if the data was streamed to all the entertainment devices, whilst at the same time the entertainment devices that happen to require the streamed content can all obtain it.

This arrangement reduces the operating cost of running the virtual environment (or environments), whilst allowing for central control of when content is displayed, despite the ad-hoc nature of the recipient group of devices.

Figure 1:
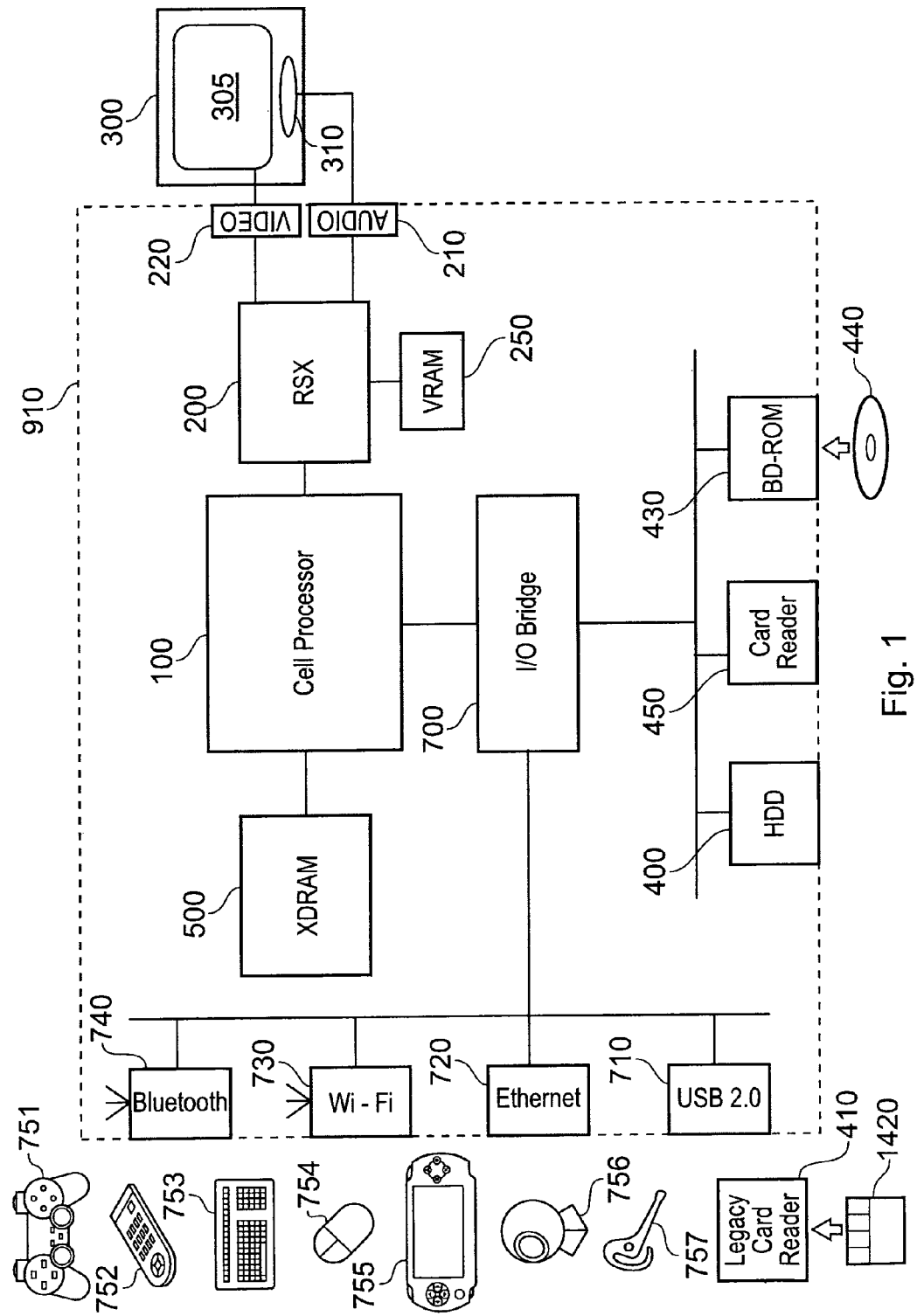
FIG. 1 is a schematic diagram of an entertainment device.

Referring now to FIG. 1, in an embodiment of the present invention, the entertainment device is a Sony® Playstation 3s® (PS3®). FIG. 1 schematically illustrates the overall system architecture of the Sony® Playstation 3® entertainment device; a system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting of up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
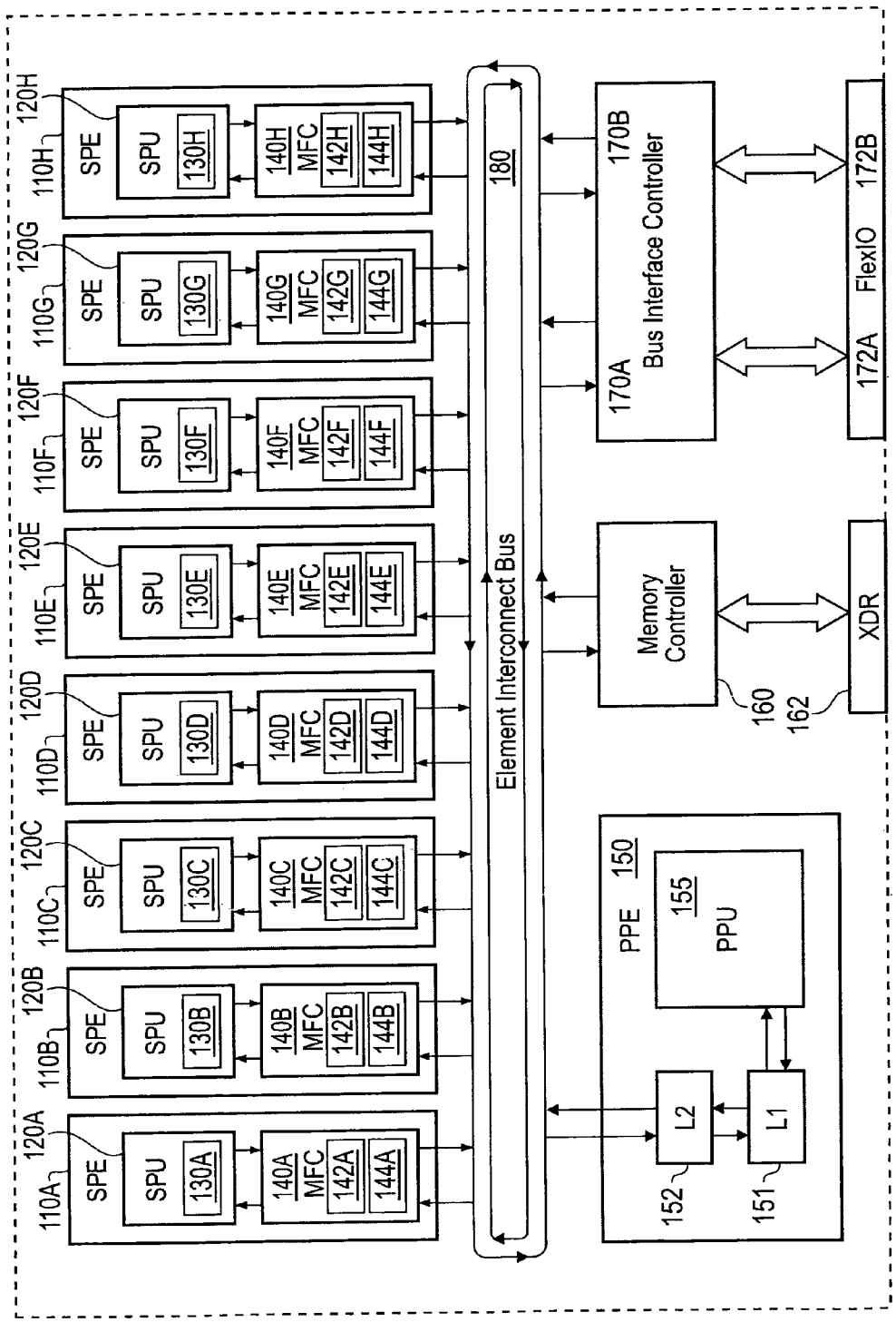
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation.

The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
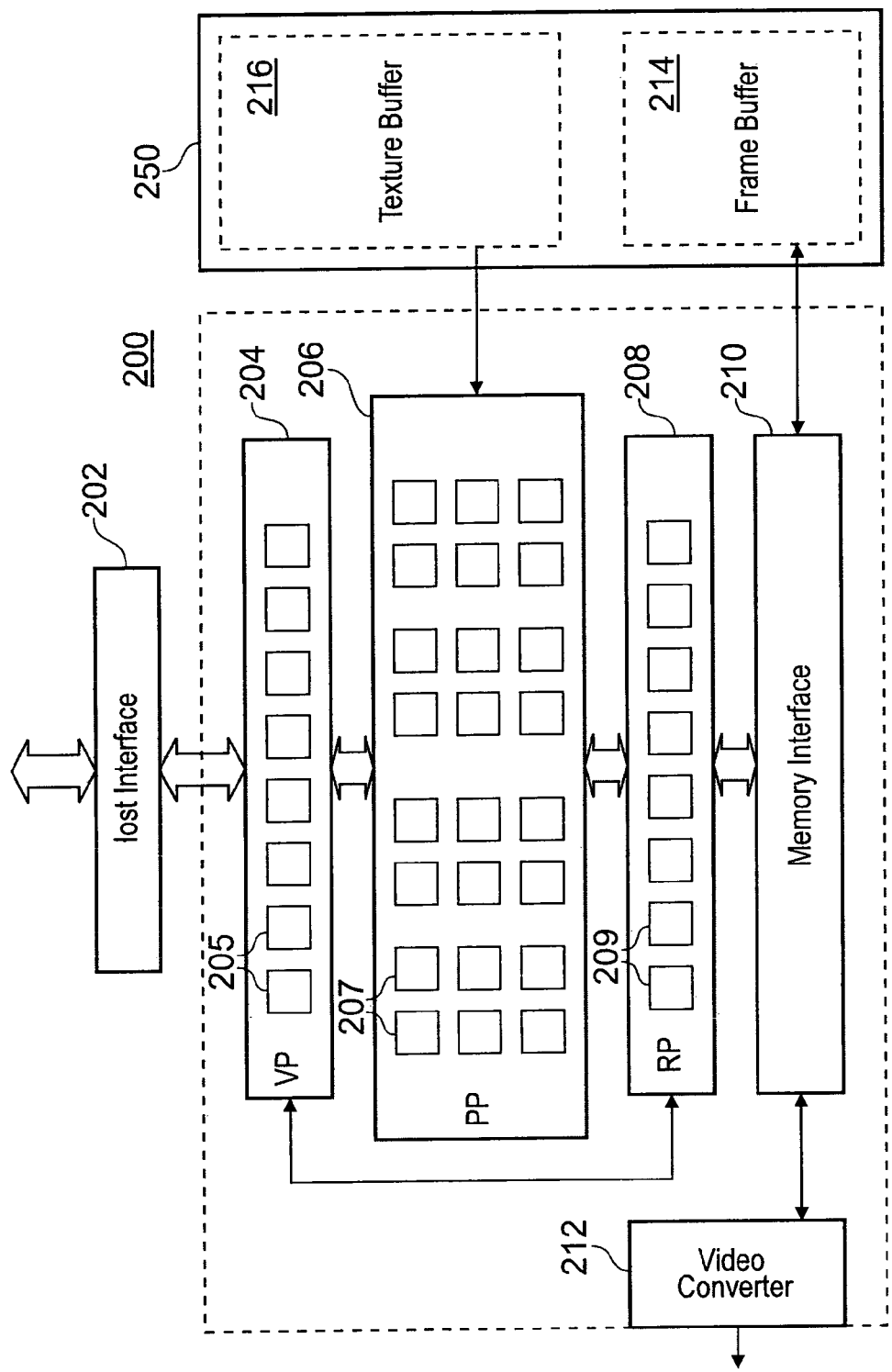
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

In an embodiment of the present invention, the above-mentioned online capability comprises interaction with the above-mentioned virtual world (or environment) populated by avatars of the user of the PS3 10 and of other PS3 users who are currently online.

The software to enable the virtual interactive environment is typically resident on the HDD 400, and can be upgraded and/or expanded by software that is downloaded, or stored on optical disk 440, or accessed by any other suitable means. Alternatively, the software may reside on a flash memory card 420, optical disk 440 or a central server (not shown).

In an embodiment of the present invention, the virtual interactive environment (hereafter called the 'Home' environment) is selected from the cross-media bar. The Home environment then starts in a conventional manner similar to a 3D video game by loading and executing control software, loading 3D models and textures into video memory 250, and rendering scenes depicting the Home environment. Alternatively or in addition, the Home environment can be initiated by other programs, such as a separate game.

Figure 4:
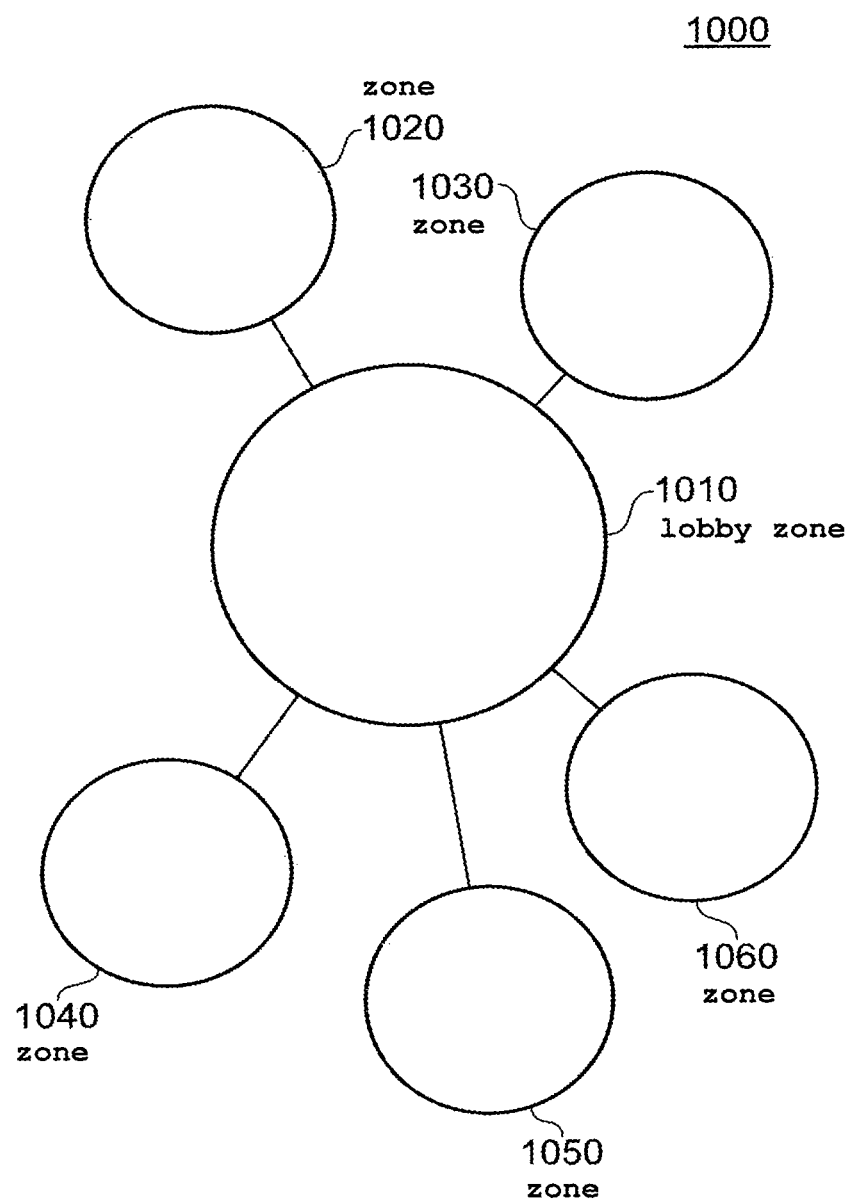
FIG. 4 is a schematic diagram of an interconnected set of game zones in accordance with an embodiment of the present invention.
Figure 5:
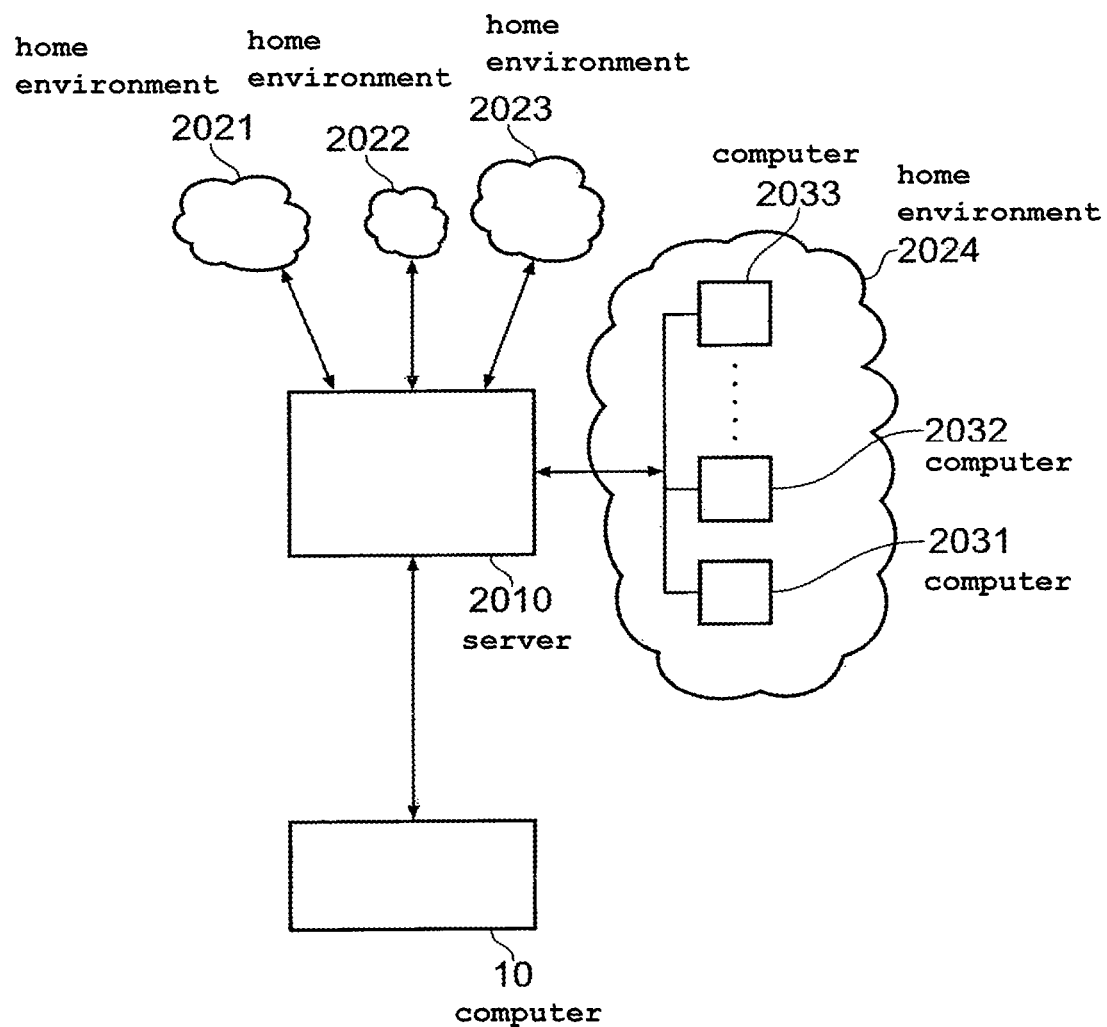
FIG. 5 is a schematic diagram of a Home environment online client/server arrangement in accordance with an embodiment of the present invention.

Referring now to FIG. 4, which displays a notional map of the Home environment, and FIG. 5, which is a schematic diagram of a Home environment online client/server arrangement, the user's avatar is spawned within a lobby zone 1010 by default. However, a user can select among other zones 1010-1060 (detailed below) of the map, causing the select zone to be loaded and the avatar to be spawned within that zone. In an embodiment of the to present invention, the map screen further comprises a sidebar on which the available zones may be listed, together with management tools such as a ranking option, enabling zones to be listed in order of user preference, or such as most recently added and/or A-Z listings. In addition a search interface may allow the user to search for a zone by name. In an embodiment of the present invention, there may be many more zones available than are locally stored on the user's PS3 at any one time; the local availability may be colour coded on the list, or the list may be filtered to only display locally available zones. If the user selects a locally unavailable zone, it can be downloaded from a Home environment Server 2010.

Figure 6A:
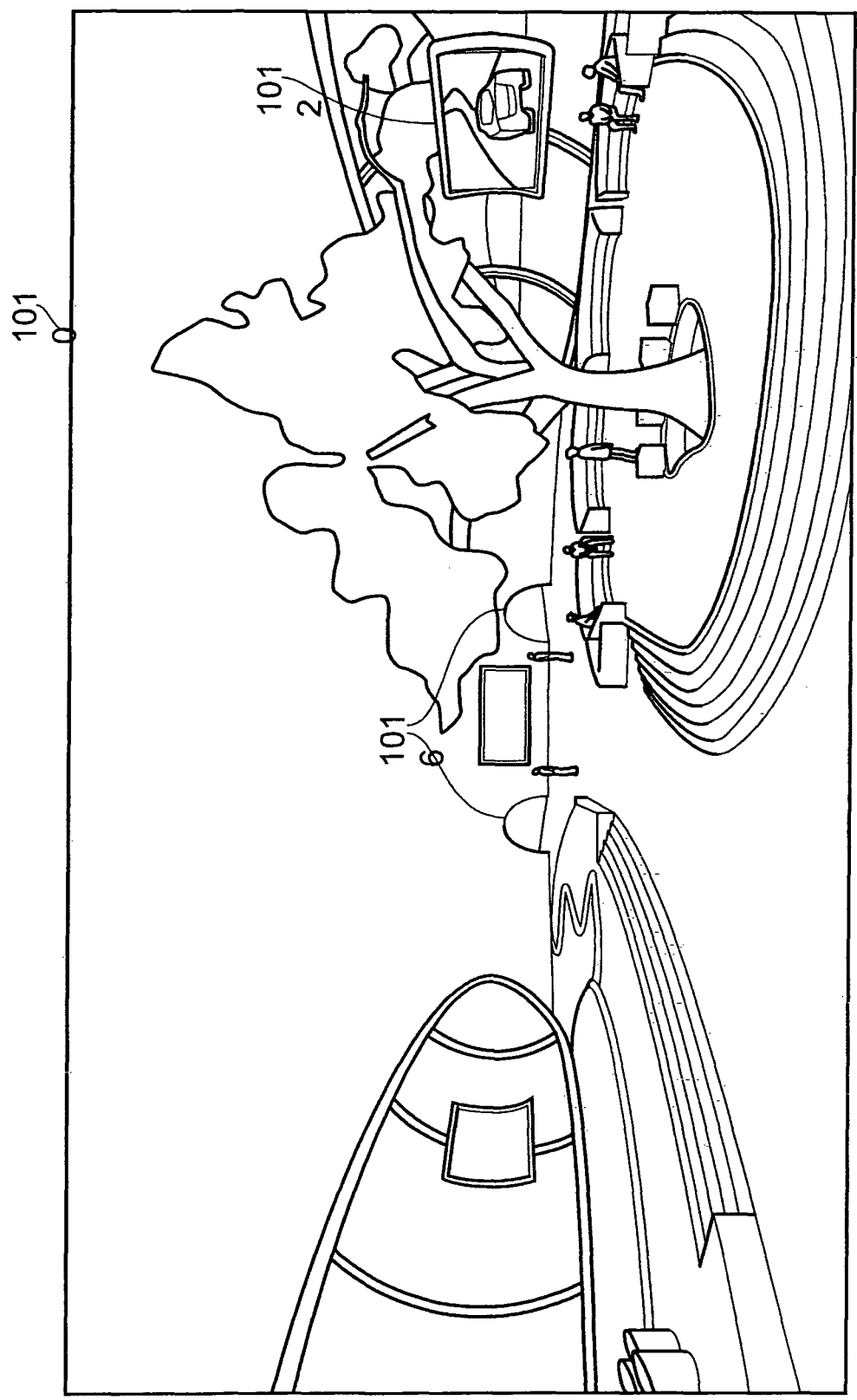
FIG. 6a is a schematic diagram of a lobby zone in accordance with an embodiment of the present invention.

Referring now to FIG. 6a, the lobby zone 1010 typically resembles a covered piazza, and may comprise parkland (grass, trees, sculptures etc.), and gathering spaces (such as open areas, single benches or rows of seats etc.) where users can meet through their avatars.

The lobby zone 1010 typically also comprises advertisement hoardings, for displaying either still or moving adverts for games or other content or products. These may be on the walls of the lobby, or may stand alone.

The lobby zone 1010 may also include an open-air cinema 1012 showing trailers, high-profile adverts or other content from third-party providers. Such content is typically streamed or downloaded from a Home environment server 2010 to which the PS3 10 connects when the Home environment is loaded, as described in more detail later.

The cinema screen is accompanied by seating for avatars in front of it, such that when an avatar sits down, the camera angle perceived by the user of the avatar also encompasses the screen.

Figure 6B:
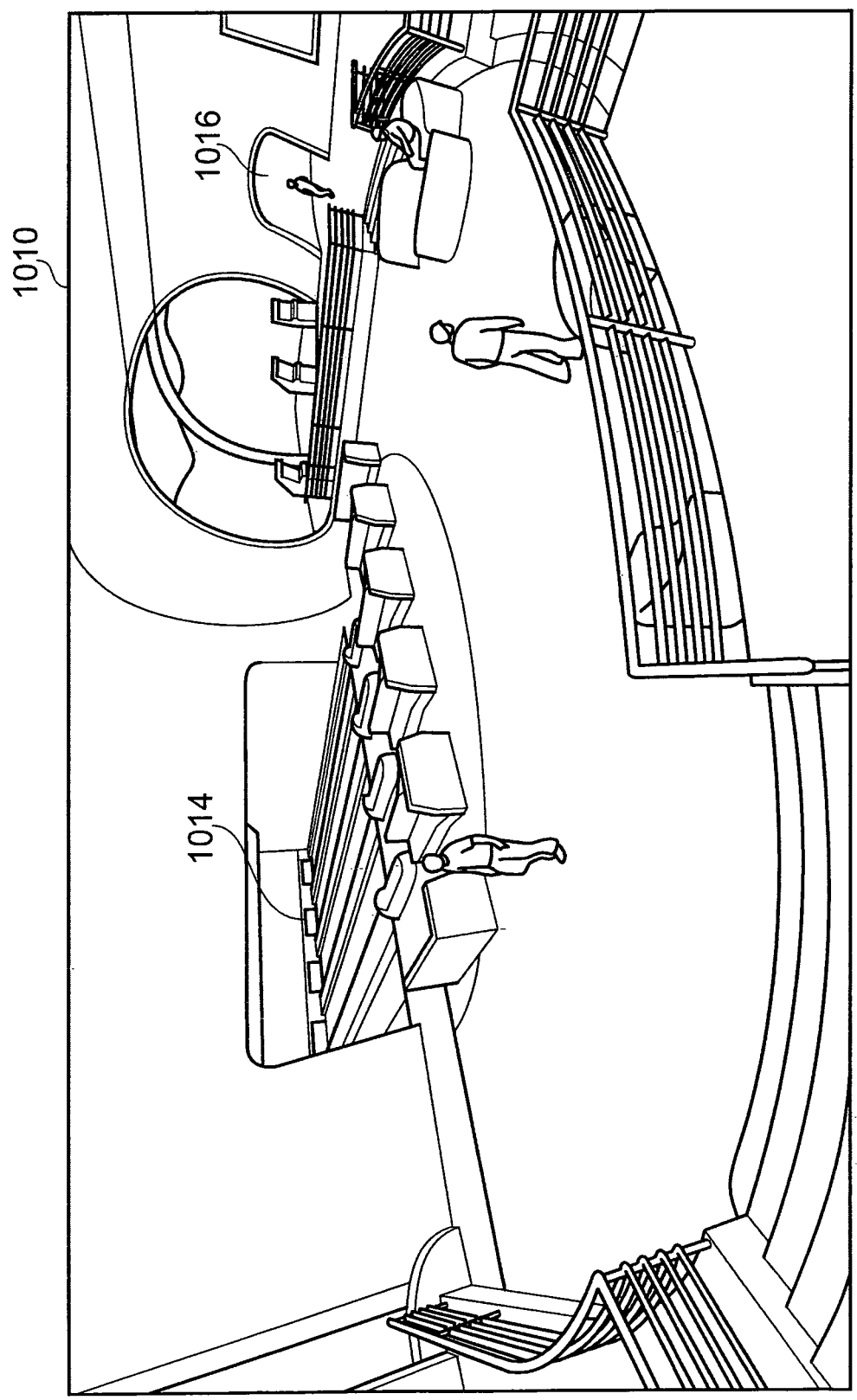
FIG. 6b is a schematic diagram of a lobby zone in accordance with an embodiment of the present invention.

Referring now also to FIG. 6b, the lobby zone 1010 may also include general amusements 1014, such as functioning pool tables, bowling alleys, and/or a video arcade. Games of pool or bowling may be conducted via the avatar, such that the avatar holds the pool cue or bowling ball, and is controlled in a conventional manner for such games. In the video arcade, if an avatar approaches a videogame machine, the home environment may switch to a substantially full-screen representation of the videogame selected. Such games may, for example, be classic arcade or console games such as Space Invaders®, or Pac-Man®, which are comparatively small in terms of memory and processing and can be emulated by the PS3 within the Home environment or run as plug-ins to the Home environment. In this case, typically the user will control the game directly, without representation by the avatar. The game will switch back to the default Home environment view if the user quits the game, or causes the avatar to move away from the videogame machine. In addition to classic arcade games, user-created game content may be featured on one or more of the virtual video game machines. Such content may be the subject of on-line competitions to be featured in such a manner, with new winning content downloaded on a regular basis.

In addition to the lobby zone 1010, other zones (e.g. zones 1020, 1030, 1040, 1050 and 1060, which may be rooms, areas or other constructs) are available. These may be accessed either via a map screen similar in nature to that of FIG. 4, or alternatively the user can walk to these other areas by guiding their avatar to various exits 1016 from the lobby.

Typically, an exit 1016 takes the form of a tunnel or corridor (but may equally take the form of an anteroom) to the next area. While the avatar is within the tunnel or anteroom, the next zone is loaded into memory. Both the lobby and the next zone contain identical models of the tunnel or anteroom, or the model is a common resource to both. In either case, the user's avatar is relocated from the lobby-based version to the new zone-based version of the tunnel or anteroom at the same position. In this way the user's avatar can apparently walk seamlessly throughout the Home environment, without the need to retain the whole environment in memory at the same time.

Figure 6C:
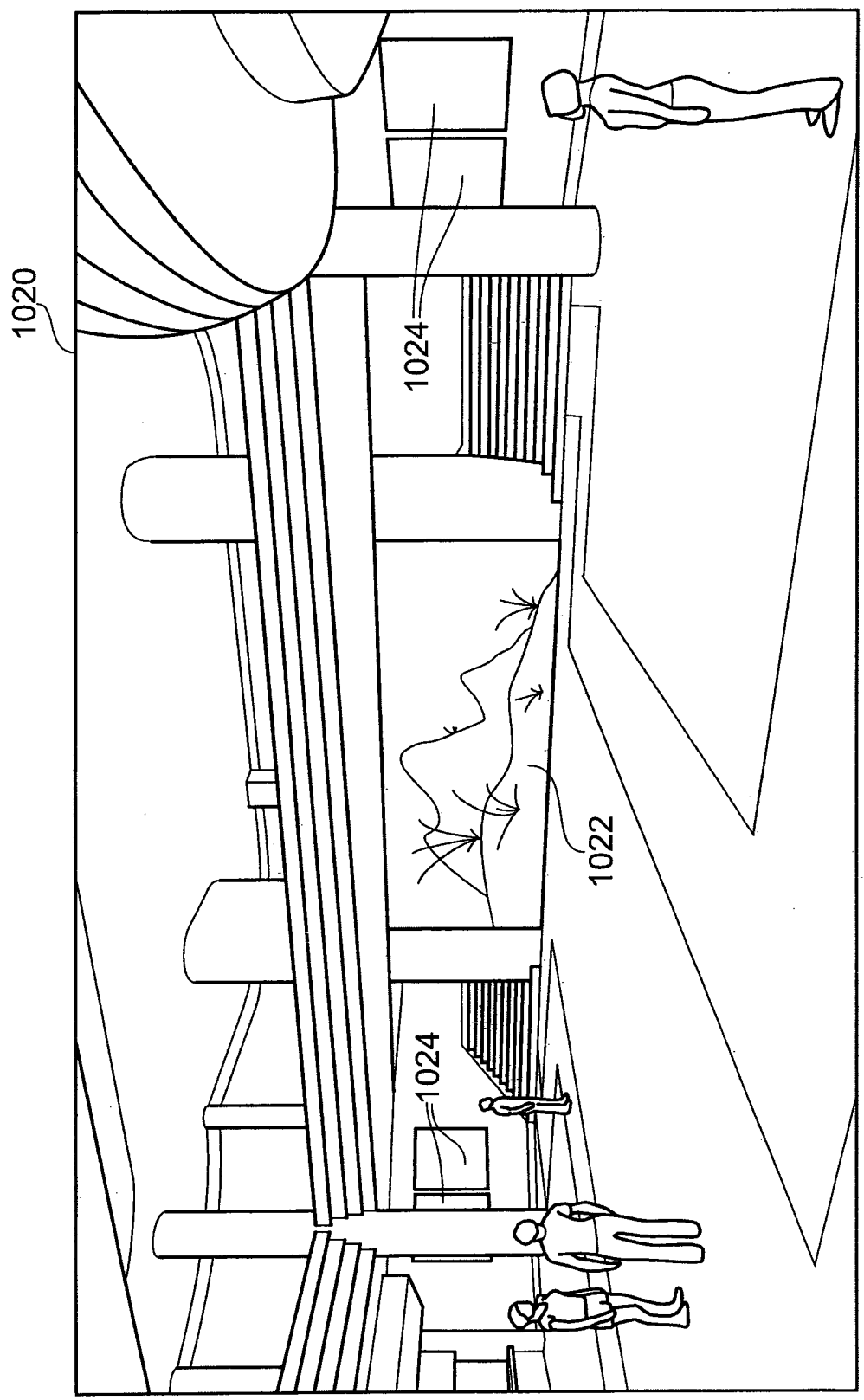
FIG. 6c is a schematic diagram of a cinema zone in accordance with an embodiment of the present invention.

Referring now also to FIG. 6c, one available zone is a Cinema zone 1020. The Cinema zone 1020 resembles a multiplex cinema, comprising a plurality of screens that may show content such as trailers, movies, TV programmes, or adverts downloaded or streamed from a Home environment server 2010 as noted previously and detailed below, or may show content stored on the HDD 400 or on an optical disk 440, such as a Blu-Ray disk.

Typically, the multiplex cinema will have an entrance area featuring a screen 1022 on which high-profile trailers and adverts may be shown to all visitors, together with poster adverts 1024, typically but not limited to featuring upcoming movies. Specific screens and the selection and display of the trailers and posters can each be restricted according to the age of the user, as registered with the PS3. This age restriction can be applied to any displayed content to which an age restriction tag is associated, in any of the zones within the Home environment.

In addition, in an embodiment of the present invention the multiplex cinema provides a number of screen rooms in which featured content is available, and amongst which the user can select. Within a screen room downloaded, streamed or locally stored media can be played within a virtual cinema environment, in which the screen is set in a room with rows of seats, screen curtains, etc. The cinema is potentially available to all users in the Home environment, and so the avatars of other users may also be visible, for example watching commonly streamed material such as a web broadcast. Alternatively, the user can zoom in so that the screen occupies the full viewing area.

Figure 6D:
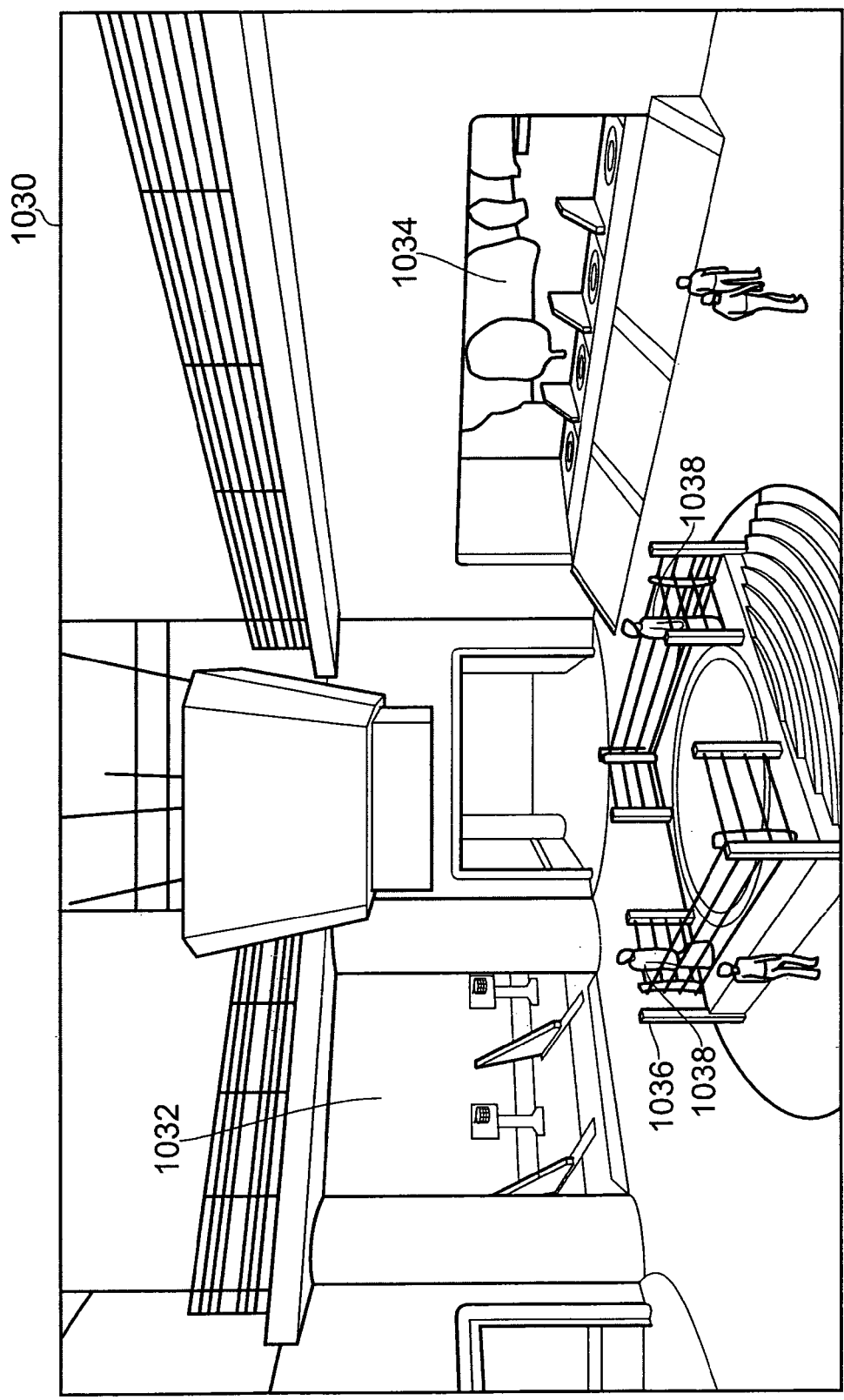
FIG. 6d is a schematic diagram of a developer/publisher zone in accordance with an embodiment of the present invention.

Referring now also to FIG. 6d, another type of zone is a developer or publisher zone 1030. Typically, there may be a plurality of such zones available. Optionally, each may have its own exit from the lobby area 1010, or alternatively some or all may share an exit from the lobby and then have separate exits from within a tunnel or ante-room model common to or replicated by each available zone therein. Alternatively they may be selected from a menu, either in the form of a pop-up menu, or from within the Home environment, such as by selecting from a set of signposts. In these latter cases the connecting tunnel or anteroom will appear to link only to the selected developer or publisher zone 1030. Alternatively or in addition, such zones may be selected via the map screen, resulting in the zone being loaded in to memory, and the avatar re-spawning within the selected zone.

Developer or publisher zones 1030 provide additional virtual environments, which may reflect the look and feel of the developer or publisher's products, brands and marks.

The developer or publisher zones 1030 are supplementary software modules to the Home environment and typically comprise additional 3D models and textures to provide the structure and appearance of the zone.

In addition, the software operable to implement the Home environment supports the integration of third party software via an application program interface (API). Therefore, developers can integrate their own functional content within the Home environment of their own zone. This may take the form of any or all of:

i. Downloading/streaming of specific content, such as game trailers or celebrity endorsements;
ii. Changes in avatar appearance, behaviour and/or communication options within the zone;
iii. The provision of one or more games, such as basketball 1032 or a golf range 1034, optionally branded or graphically reminiscent of the developer's or publisher's games;
iv. One or more interactive scenes or vignettes representative of the developer's or publisher's games, enabling the player to experience an aspect of the game, hone a specific skill of the game, or familiarise themselves with the controls of a game;
v. An arena, ring, dojo, court or similar area 1036 in which remotely played games may be represented live by avatars 1038, for spectators to watch.

Thus, for example, a developer's zone resembles a concourse in the developer's signature colours and featuring their logos, onto which open gaming areas, such as soccer nets, or a skeet range for shooting. In addition, a booth (not shown) manned by game-specific characters allows the user's avatar to enter and either temporarily change into the lead character of the game, or zoom into a first person perspective, and enter a further room resembling a scene from the featured game. Here the user interacts with other characters from the game, and plays out a key scene. Returning to the concourse, adverts for the game and other content are displayed on the walls. At the end of the zone, the concourse opens up into an arena where a 5-a-side football match is being played, where the positions of the players and the ball correspond to a game currently being played by a popular group, such as a high-ranking game clan, in another country.

In embodiments of the present invention, developer/publisher zones are available to download. Alternatively or in addition, to reduce bandwidth they may be supplied as demo content on magazine disks, or may be installed/upgraded from disk as part of the installation process for a purchased game of the developer or publisher. In the latter two examples, subsequent purchase or registration of the game may result in further zone content being unlocked or downloaded. In any event, further modifications, and timely advert and trailer media, may be downloaded as required.

A similar zone is the commercial zone 1040. Again, there may be a plurality of such commercial zones accessible in similar manner to the developer and publisher zones. Like developer/publisher zones 1030, Commercial zones 1040 may comprise representative virtual assets of one or more commercial vendors in the form of 3D models, textures etc., enabling a rendering of their real-world shops, brands and identities, and these may be geographically and/or thematically grouped within zones.

Space within commercial zones may be rented as so-called 'virtual real-estate' by third parties. For example, a retailer may pay to have a rendering of their shop included within a commercial zone 1040 as part of a periodic update of the Home environment supplied via the Home environment server 2010, for example on a monthly or annual renewal basis. A retailer may additionally pay for the commerce facilities described above, either on a periodic basis or per item. In this way they can provide users of the Home environment with a commercial presence.

Again, the commercial zone comprises supplementary software that can integrate with the home environment via an API, to provide additional communication options (shop-specific names, goods, transaction options etc), and additional functionality, such as accessing an online database of goods and services for purchase, determining current prices, the availability of goods, and delivery options. Such functions may be accessed either via a menu (either as a pop-up or within the Home environment, for example on a wall) or via communication with automated avatars. Communication between avatars is described in more detail later.

It will be appreciated that developers and publishers can also provide stores within commercial zones, and in addition that connecting tunnels between developer/publisher and commercial zones may be provided. For example, a tunnel may link a developer zone to a store that sells the developer's games. Such a tunnel may be of a 'many to one' variety, such that exits from several zones emerge from the same tunnel in-store. In this case, if re-used, typically the tunnel would be arranged to return the user to the previous zone rather than one of the possible others.

In an embodiment of the present invention, the software implementing the Home environment has access to an online-content purchase system provided by the PS3 OS. Developers, publishers and store owners can use this system via an interface to specify the IP address and query text that facilitates their own on-line transaction. Alternatively, the user can allow their PS3 registration details and credit card details to be used directly, such that by selecting a suitably enabled object, game, advert, trailer or movie anywhere within the Home environment, they can select to purchase that item or service. In particular, the Home environment server 2010 can store and optionally validate the user's credit card and other details so that the details are ready to be used in a transaction without the user having to enter them. In this way the Home environment acts as an intermediary in the transaction. Alternatively such details can be stored at the PS3 and validated either by the PS3 or by the Home environment server.

Figure 7:
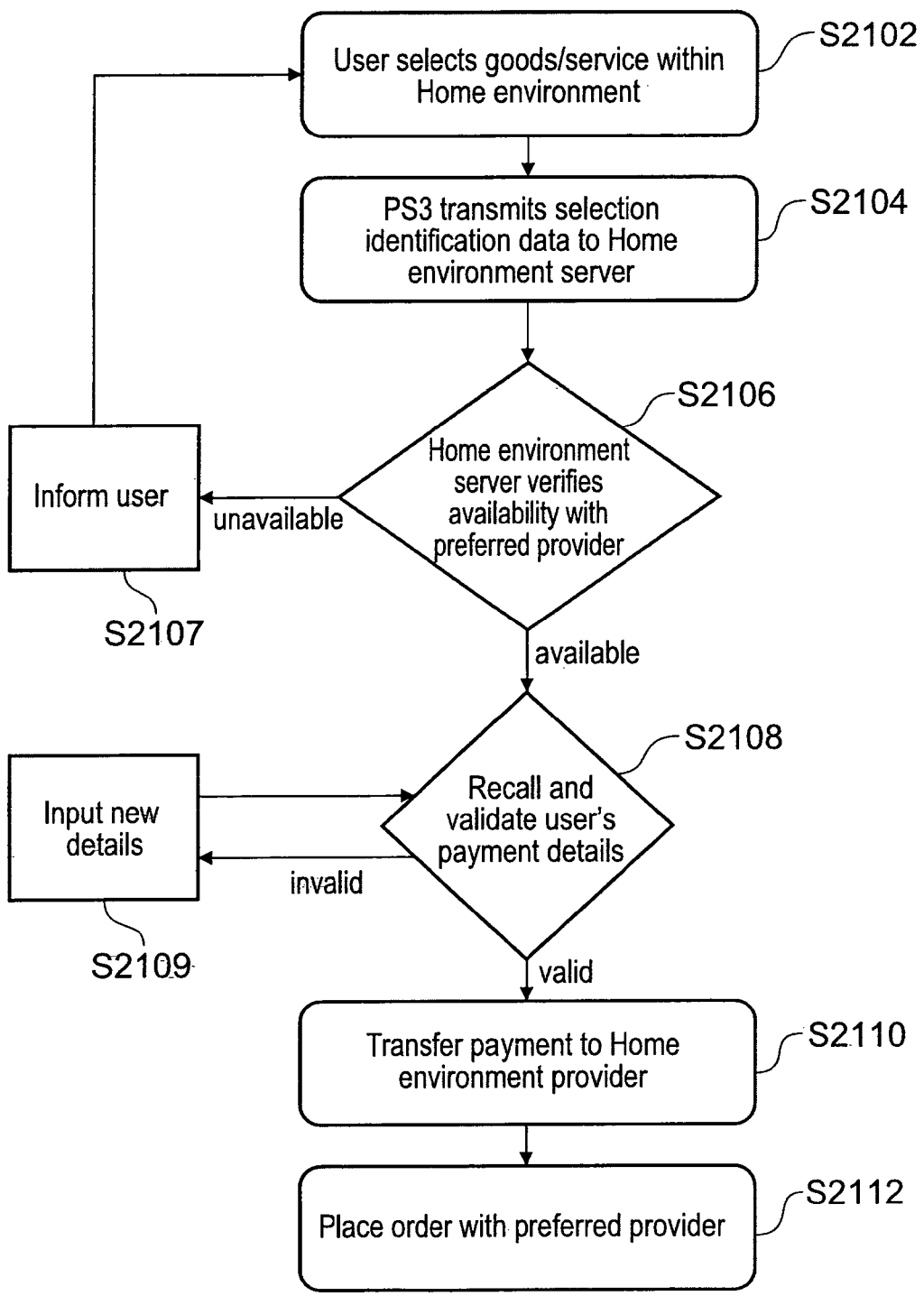
FIG. 7 is a flow diagram of a method of on-line transaction in accordance with an embodiment of the present invention.

Thus, referring now also to FIG. 7, in an embodiment of the present invention a method of sale comprises in a step s2102 a user selecting an item (goods or a service) within the Home environment. In step s2104, the PS3 10 transmits identification data corresponding with the object to the Home environment server 2010, which in step s2016 verifies the item's availability from a preferred provider (preferably within the country corresponding to the IP address of the user). If the item is unavailable then in step s2107 it informs the user by transmitting a message to the user's PS3 10. Alternatively, it first checks for availability from one or more secondary providers, and optionally confirms whether supply from one of these providers is acceptable to the user. In step s2108, the Home environment server retrieves from data storage the user's registered payment details and validates them. If there is no valid payment method available, then the Home environment may request that the user enters new details via a secure (i.e. encrypted) connection. Once a valid payment method is available, then in step s2110 the Home environment server requests from the appropriate third part payment provider a transfer of payment from the user's account. Finally, in s2112 the Home environment server places an order for the item with the preferred provider, giving the user's delivery address or IP address as applicable, and transferring appropriate payment to the preferred provider's account.

In this way, commerce is not limited specifically to shops. Similarly, it is not necessary for shops to provide their own commerce applications if the preferred provider for goods or services when displayed within a shop is set to be that shop's owner. Where the goods or service may be digitally provided, then optionally it is downloaded from the preferred provider directly or via a Home environment server 2010.

In addition to the above public zones, there are additional zones that are private to the individual user and may only be accessed by them or by invitation from them. These zones also have exits from the communal lobby area, but when entered by the avatar (or chosen via the map screen), load a respective version of the zone that is private to that user.

Figure 8A:
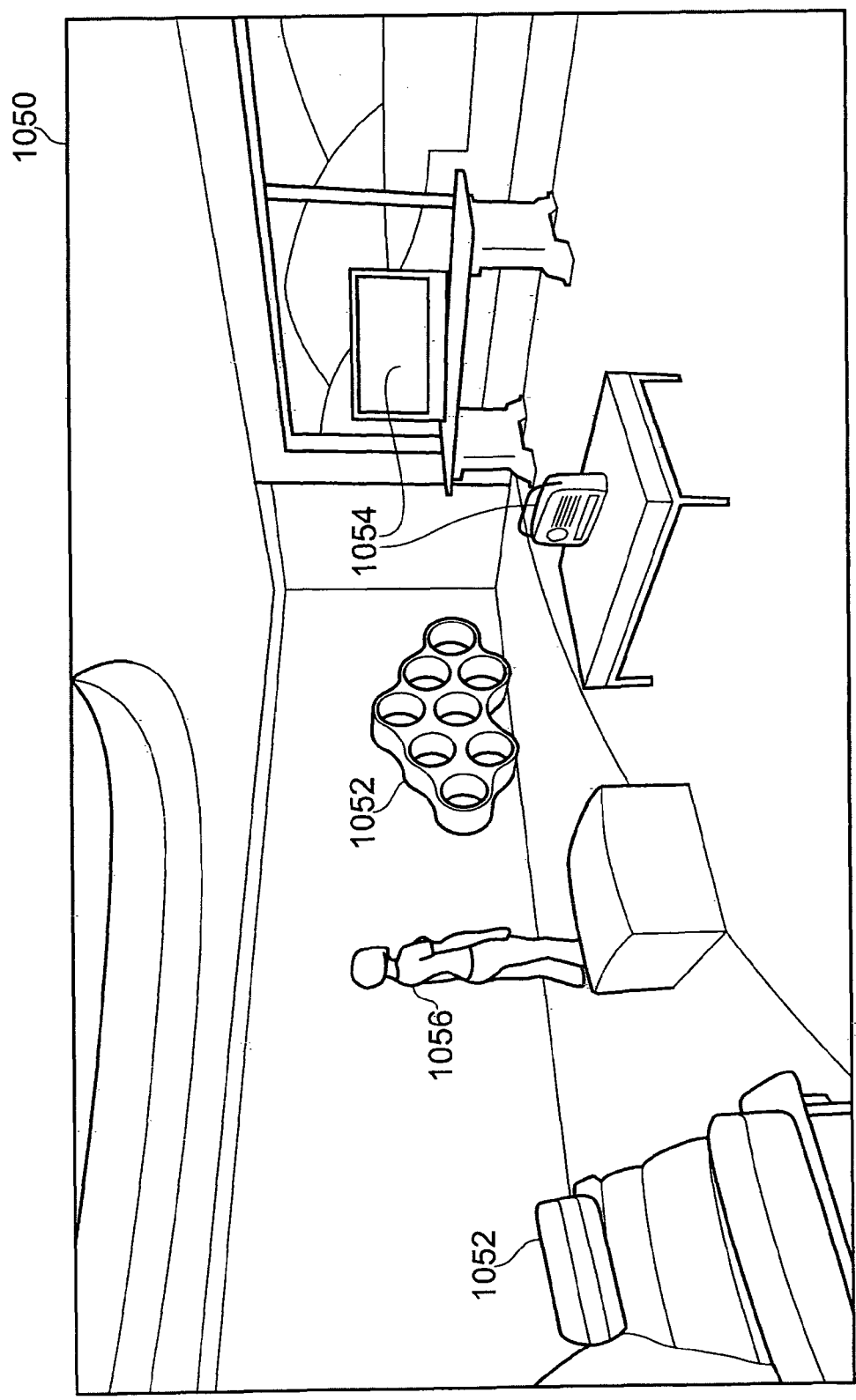
FIG. 8a is schematic diagram of an apartment zone in accordance with an embodiment of the present invention.

Referring to FIG. 8*a*, the first of these zones is an apartment zone 1050. In an embodiment of the present invention, this is a user-customisable zone in which such features 1052 as wallpaper, flooring, pictures, furniture, outside scenery and lighting may be selected and positioned. Some of the furniture is functional furniture 1054, linked to PS3 functionality.

For example, a television may be placed in the apartment 1050 on which can be viewed one of several streamed video broadcasts, or media stored on the PS3 HDD 400 or optical disk 440. Similarly, a radio or hi-fi may be selected that contains pre-selected links to internet radio streams. In addition, user artwork or photos may be imported into the room in the form of wall hangings and pictures.

Optionally, the user (represented in FIG. 8*a* by their avatar 1056) may purchase a larger apartment, and/or additional goods such as a larger TV, a pool table, or automated non-player avatars. Other possible items include a gym, swimming pool, or disco area. In these latter cases, additional control software or configuration libraries to provide additional character functionality will integrate with the home environment via the API in a similar fashion to that described for the commercial and developer/publisher zones 1030, 1040 described previously.

Such purchases may be made using credit card details registered with the Home environment server. In return for a payment, the server downloads an authorisation key to unlock the relevant item for use within the user's apartment. Alternatively, the 3D model, textures and any software associated with an item may also be downloaded from the Home environment server or an authorised third-party server, optionally again associated with an authorisation key. The key may, for example, require correspondence with a firmware digital serial number of the PS3 10, thereby preventing unauthorised distribution.

A user's apartment can only be accessed by others upon invitation from the respective user. This invitation can take the form of a standing invitation for particular friends from within a friends list, or in the form of a single-session pass conferred on another user, and only valid whilst that user remains in the current Home environment session. Such invitations may take the form of an association maintained by a Home environment server 2010, or a digital key supplied between PS3 devices on a peer-to-peer basis that enables confirmation of status as an invitee.

In an embodiment of the present invention invited users can only enter the apartment when the apartment's user is present within the apartment, and are automatically returned to the lobby if the apartment's user leaves. Whilst within the apartment, all communication between the parties present (both user and positional data) is purely peer-to-peer.

The apartment thus also provides a user with the opportunity to share home created content such as artwork, slideshows, audio or video with invited guests, and also to interact with friends without potential interference from other users within the public zones.

When invited guests enter a user's apartment, the configuration of the room and the furnishings within it are transmitted in a peer-to-peer fashion between the attendees using ID codes for each object and positional data. Where a room or item are not held in common between the user and a guest, the model, textures and any code required to implement it on the guest's PS3 may also be transmitted, together with a single-use key or similar constraint, such as use only whilst in the user's apartment and whilst the user and guest remain online in this session.

Figure 8B:
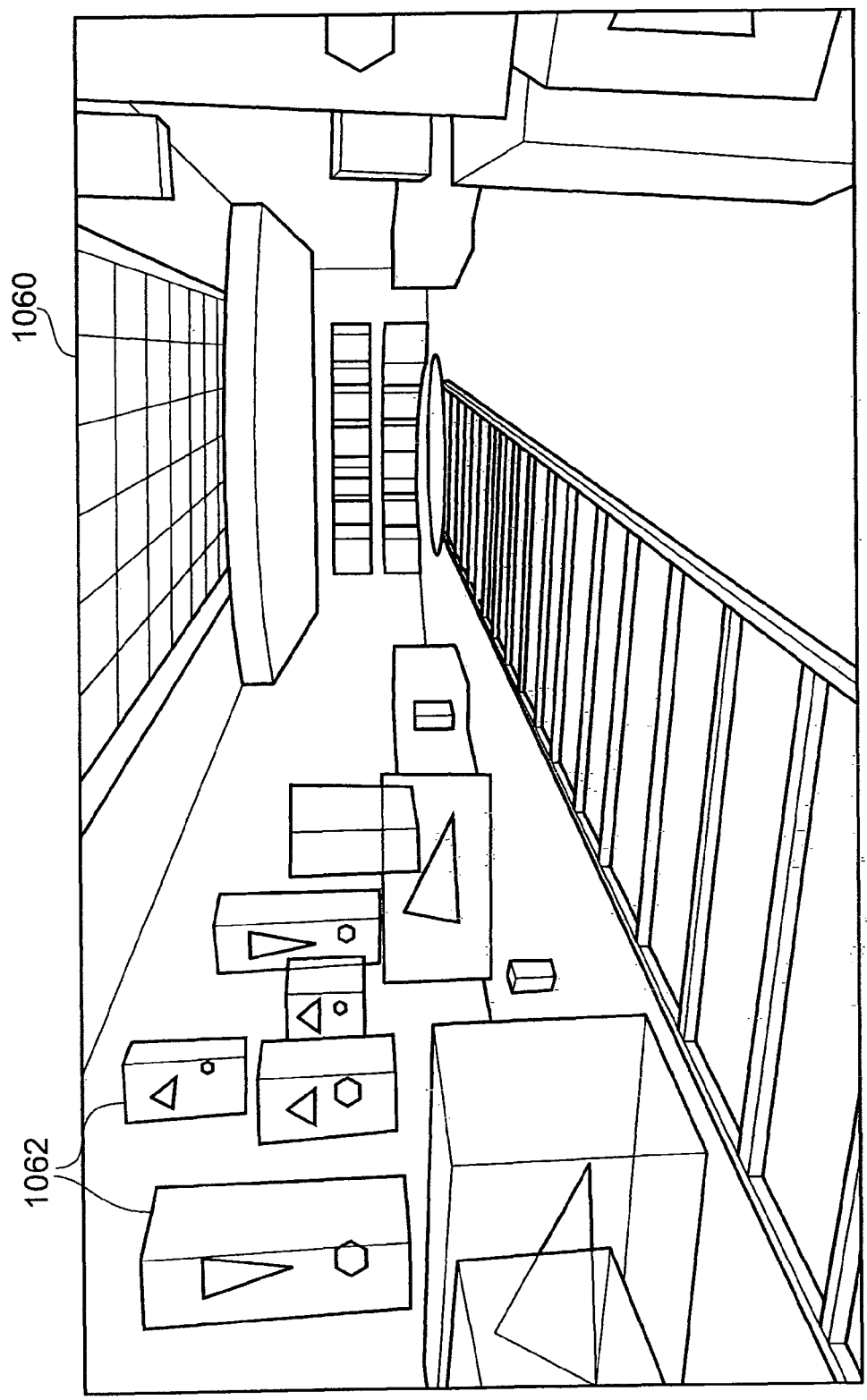
FIG. 8b is schematic diagram of a trophy room zone in accordance with an embodiment of the present invention.

Referring to FIG. 8*b*, a further private space that may similarly be accessed only by invitation is the user's Trophy Room 1060. The Trophy Room 1060 provides a space within which trophies 1062 earned during game play may be displayed.

For example, a third-party game comprises seeking a magical crystal. If the player succeeds in finding the crystal, the third party game nominates this as a trophy for the Trophy Room 1060, and places a 3D model and texture representative of the crystal in a file area accessed by the Home environment software when loading the Trophy Room 1060. The software implementing the Home environment can then render the crystal as a trophy within the Trophy Room.

When parties are invited to view a user's trophy room, the models and textures required to temporarily view the trophies are sent from the user's PS3 to those of the other parties on a peer-to-peer basis. This may be done as a background activity following the initial invitation, in anticipation of entering the trophy room, or may occur when parties enter a connecting tunnel/anteroom or select the uses trophy room from the map screen. Optionally, where another party also has that trophy, they will not download the corresponding trophy from the user they are visiting. Therefore, in an embodiment of the present invention, each trophy comprises an identifying code.

Alternatively or in addition, a trophy room may be shared between members of a group or so-called 'clan', such that a trophy won by any member of the clan is transmitted to other members of the clan on a peer-to-peer basis. Therefore all members of the clan will see a common set of trophies.

Alternatively or in addition, a user can have a standing invitation to all members of the Home environment, allowing anyone to visit their trophy room. As with the commercial and developer/publisher zones, a plurality of rooms is therefore possible, for example a private, a group-based and a public trophy room. This may be managed either by selection from a pop-up menu or signposts within the Home environment as described previously, or by identifying relevant user by walking up to their avatar, and then selecting to enter their (public) trophy room upon using the trophy room exit from the lobby.

Alternatively or in addition, a public trophy room may be provided. This room may display the trophies of the person in the current instance of the Home environment who has the most trophies or a best overall score according to a trophy value scoring scheme. Alternatively it may be an aggregate trophy room, showing the best, or a selection of, trophies from some or all of the users in that instance of the Home environment, together with the ID of the user. Thus, for example, a user could spot a trophy from a game they are having difficulty with, identify who in the Home environment won it, and then go and talk to them about how they won it. Alternatively, a public trophy room could contain the best trophies across a plurality of Home environments, identifying the best garners within a geographical, age specific or game specific group, or even world wide. Alternatively or in addition, a leader board of the best scoring gainers can be provided and updated live.

It will be appreciated that potentially a large number of additional third party zones may become available, each comprising additional 3D models, textures and control software. As a result a significant amount of space on HDD 400 may become occupied by Home environment zones.

Consequently, in an embodiment of the present invention the number of third party zones currently associated with a user's Home environment can be limited. In a first instance, a maximum memory allocation can be used to prevent additional third party zones being added until an existing one is deleted. Alternatively or in addition, third party zones may be limited according to geographical relevance or user interests (declared on registration or subsequently via an interface with the Home environment server 2010), such that only third party zones relevant to the user by these criteria are downloaded. Under such a system, if a new third party zone becomes available, its relevance to the user is evaluated according to the above criteria, and if it is more relevant than at least one of those currently stored, it replaces the currently least relevant third party zone stored on the user's PS3.

Other criteria for relevance may include interests or installed zones of nominated friends, or the relevance of zones to games or other media that have been played on the user's PS3.

Further zones may be admitted according to whether the user explicitly installs them, either by download or by disk.

As noted above, within the Home environment users are represented by avatars. The software implementing the Home environment enables the customisation of a user's avatar from a selection of pre-set options in a similar manner to the customisation of the user's apartment. The user may select gender and skin tone, and customise the facial features and hair by combining available options for each. The user may also select from a wide range of clothing. To support this facility, a wide range of 3D models and textures for avatars are provided. In an embodiment of the present invention, user may import their own textures to display on their clothing. Typically, the parameters defining the appearance of each avatar only occupy around 40 bytes, enabling fast distribution via the home server when joining a populated Home environment.

Each avatar in the home environment can be identified by the user's ID or nickname, displayed in a bubble above the avatar. To limit the proliferation of bubbles, these fade into view when the avatar is close enough that the text it contains could easily be read, or alternatively when the avatar is close enough to interact with and/or is close to the centre of the user's viewpoint.

The avatar is controlled by the user in a conventional third-person gaming manner (e.g. using the game controller 751), allowing them to walk around the Home environment. Some avatar behaviour is contextual; thus for example the option to sit down will only be available when the avatar is close to a seat. Other avatar behaviour is available at all times, such as for example the expression of a selected emotion or gesture, or certain communication options. Avatar actions are determined by use of the game controller 751, either directly for actions such as movement, or by the selection of actions via a pop-up menu, summoned by pressing an appropriate key on the game controller 751.

Options available via such a menu include further modification of the avatar's appearance and clothing, and the selection of emotions, gestures and movements. For example, the user can select that their avatar smiles, waves and jumps up and down when the user sees someone they know in the Home environment.

Users can also communicate with each other via their avatars using text or speech.

To communicate by text, in an embodiment of the present invention, messages appear in pop-up bubbles above the relevant avatar, replacing their name bubble if necessary.

Figure 9:
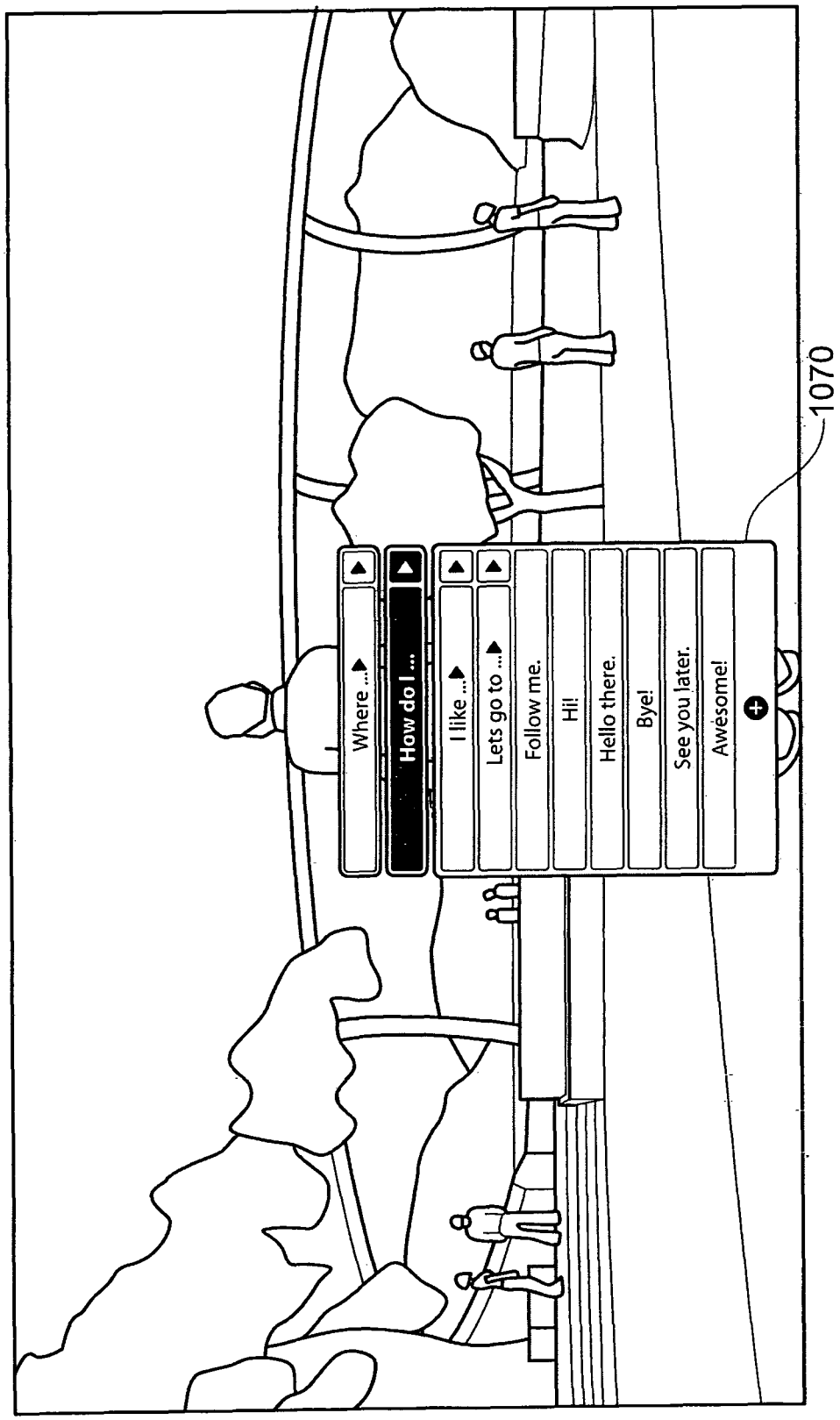
FIG. 9 is a schematic diagram of a communication menu in accordance with an embodiment of the present invention.

Referring now also to FIG. 9, to generate a message the user can activate a pop-up menu 1070 in which a range of preset messages is provided. These may be complete messages, or alternatively or in addition may take the form of nested menus, the navigation of which generates a message by concatenating selected options.

Alternatively or in addition, a virtual keyboard may be displayed, allowing free generation of text by navigation with the game controller 751. If a real keyboard 753 is connected via Bluetooth, then text may by typed into a bubble directly.

In an embodiment of the present invention, the lobby also provides a chat channel hosted by the Home environment server, enabling conventional chat facilities.

To communicate by speech, a user must have a microphone, such as a Bluetooth headset 757, available. Then in an embodiment of the present invention, either by selection of to a speech option by pressing a button on the game controller 751, or by use of a voice activity detector within the software implementing the Home environment, the user can speak within the Home environment. When speaking, a speech icon may appear above the head of the avatar for example to alert other users to adjust volume settings if necessary.

The speech is sampled by the user's PS3, encoded using a Code Excited Linear Prediction (CELP) codec (or other known VoIP applicable codec), and transmitted in a peer-to-peer fashion to the eight nearest avatars (optionally provided they are within a preset area within the virtual environment surrounding the user's avatar). Where more than eight other avatars are within the preset area, one or more of the PS3s that received the speech may forward it to other PS3s having respective user avatars within the area that did not receive the speech, in an ad-hoc manner. To co-ordinate this function, in an embodiment of the present invention the PS3 will transmit a speech flag to all PS3s whose avatars are within the present area, enabling them to place a speech icon above the relevant (speaking) avatars head (enabling their user to identify the speaker more easily) and also to notify the PS3s of a transmission. Each PS3 can determine from the relative positions of the avatars which ones will not receive the speech, and can elect to forward the speech to the PS3 of whichever avatar they are closest to within the virtual environment. Alternatively, the PS3s within the area can ping each other, and whichever PS3 has the lowest lag with a PS3 that has not received the speech can elect to forward it.

It will be appreciated that the limitation to eight is exemplary, and the actual number depends upon such factors as the speech compression ratio and the available bandwidth.

In an embodiment of the present invention, such speech can also be relayed to other networks, such as a mobile telephony network, upon specification of a mobile phone number. This may be achieved either by routing the speech via the Home environment server to a gateway server of the mobile network, or by Bluetooth transmission to the user's own mobile phone. In this latter case, the mobile phone may require middleware (e.g. a Java® applet) to interface with the PS3 and route the call.

Thus a user can contact a person on their phone from within the Home environment. In a similar manner, the user can also send a text message to a person on their mobile phone.

In a similar manner to speech, in an embodiment of the present invention users whose PS3s are equipped with a video camera such as the Sony® Eye Toy® video camera can use a video chat mode, for example via a pop-up screen, or via a TV or similar device within the Home environment, such as a Sony® Playstation Portable® (PSP) held by the avatar. In this case video codecs are used in addition to or instead of the audio codecs.

Optionally, the avatars of users with whom you have spoken recently can be highlighted, and those with whom you have spoken most may be highlighted more prominently, for example by an icon next to their name, or a level of glow around their avatar.

Referring back to FIG. 5, when a user selects to activate the Home environment on their PS3 10, the locally stored software generates the graphical representation of the Home environment, and connects to a Home environment server 2010 that assigns the user to one of a plurality of online Home environments 2021, 2022, 2023, 2024. Only four home environments are shown for clarity.

It will be understood that potentially many tens of thousands of users may be online at any one time. Consequently to prevent overcrowding, the Home environment server 2010 will support a large plurality of separate instances of the online Home environment. Likewise, there may be many separate Home environment servers, for example in different countries.

Once assigned to a Home environment, a PS3 initially uploads information regarding the appearance of the avatar, and then in an ongoing fashion provides to the Home environment server with positional data for its own avatar, and receives from the Home environment server the positional data of the other avatars within that online Home environment. In practice this positional update is periodic (for example every 2 seconds) to limit bandwidth, so other PS3s must interpolate movement. Such interpolation of character movement is well-known in on-line games. In addition, each update can provide a series of positions, improving the replication of movement (with some lag), or improving the extrapolation of current movement.

In addition the IP addresses of the other PS3s 2131, 2032, 2033 within that Home environment 2024 is shared so that they can transmit other data such as speech in a peer-to-peer fashion between themselves, thereby reducing the required bandwidth of data handled by the Home environment server.

To prevent overcrowding within the Home environments, each will support a maximum of, for example, 64 users.

The selection of a Home environment to which a user will be connected can take account of a number of factors, either supplied by the PS3 and/or known to the Home environment server via a registration process. These include but are not limited to:

i. The geographical location of the PS3;
    ii. The user's preferred language;
    iii. The user's age;
    iv. Whether any users within the current user's 'friends list' are in a particular Home environment already;
    v. What game disk is currently within the user's PS3;
    vi. What games have recently been played on the user's PS3.

Thus, for example, a Swiss teenager may be connected to a Home environment on a Swiss server, with a maximum user age of 16 and a predominant language of French. In another example, a user with a copy of 'Revolution' mounted in their PS3 may be connected to a home environment where a predominant number of other users also currently have the same game mounted, thereby facilitating the organisation of multiplayer games. In this latter case, the PS3 10 detects the game loaded within the BD-Rom 430 and informs the Home environment server 2010. The server then chooses a Home environment accordingly.

In a further example, a user is connected to a Home environment in which three users identified on his friends list can be found. In this latter example, the friends list is a list of user names and optionally IP addresses that have been received from other users that the user given wishes to meet regularly. Where different groups of friends are located on different Home environment servers (e.g. where the current user is the only friend common to both sets) then the user may either be connected to the one with the most friends, or given the option to choose.

Conversely, a user may invite one or more friends to switch between Home environments and join them. In this case, the user can view their friends list via a pop-up menu or from within the Home environment (for example via a screen on the wall or an information booth) and determine who is online. The user may then broadcast an invite to their friends, either using a peer-to-peer connection or, if the friend is within a Home environment or the IP address is unknown, via the Home environment server. The friend can then accept or decline the invitation to join.

To facilitate invitation, generally a Home environment server will assign less than the maximum supported number of users to a specific home environment, thereby allowing such additional user-initiated assignments to occur. This so-called 'soft-limit' may, for example, be 90% of capacity, and may be adaptive, for example changing in the early evening or at weekends where people are more likely to meet up with friends on-line.

Where several friends are within the same Home environment, in an embodiment of the present invention the map screen may also highlight those zones in which the friends can currently be found, either by displaying their name on the map or in association with the zone name on the side bar.

Figure 10:
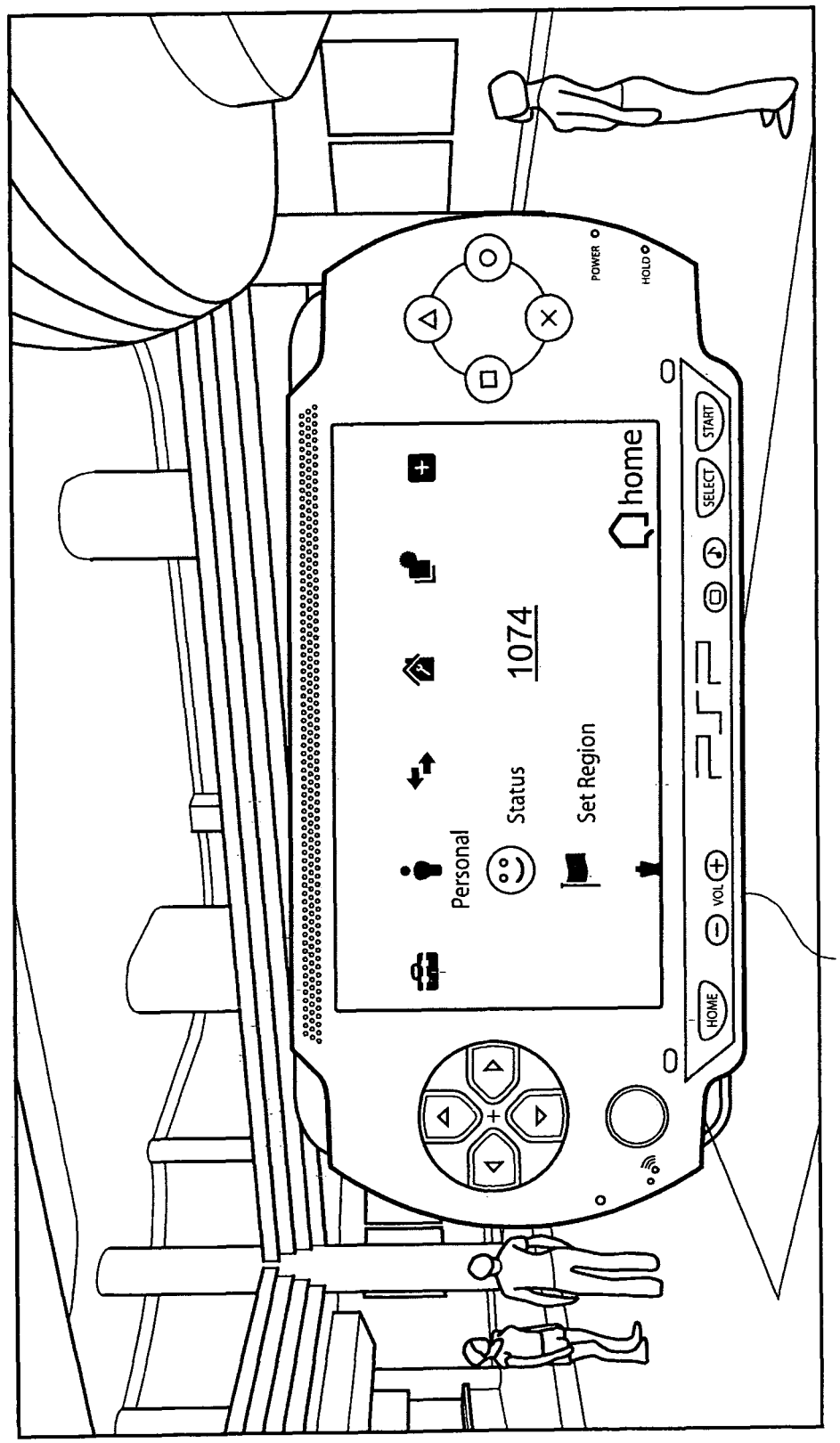
FIG. 10 is a schematic diagram of an interactive virtual user device in accordance with an embodiment of the present invention.

Referring now also to FIG. 10, in addition, preferences, settings, functions of the Home environment and optionally other functionality may be viewed, adjusted or accessed as appropriate by use of a virtual Sony® Playstation Portable® (PSP) entertainment device 1072 that can be summoned by use of the game controller 751 to pop-up on screen. The user can then access these options, settings and functionality via a PSP cross-media bar 1074 displayed on the virtual PSP. As noted above, the PSP could also be used as an interface for video chat.

When a user wishes to leave the Home environment, in embodiments of the present invention they may do so by selection of an appropriate key on the game controller 751, by selection of an exit option from a pop-up menu, by selection of an exit from within the map screen, by selection of an option via their virtual PSP or by walking through a master exit within the lobby zone.

Typically, exiting the Home environment will cause the PS3 10 to return to the PS3 cross media bar.

Finally, it will be appreciated that additional, separate environments based upon the Home environment software and separately accessible from the PS3 cross-media bar are envisaged. For example, a supermarket may provide a free disk upon which a Supermarket environment, supported in similar fashion by the Home environment servers, is provided. Upon selection, the user's avatar can browse displayed goods within a virtual rendition of the supermarket (either as 3D models or textures applied to shelves) and click on them to purchase as described above. In this way retailers can provide and update online shopping facilities for their own user base.

Referring now back to FIG. 5, in an embodiment of the present invention, when one user (for example, the user of PS3 10) manoeuvres their avatar so as to view or otherwise access streamed content within the Home environment, this content can be streamed from the Home environment server 2010 (or a content server—not shown—linked to the Home environment server).

However, where two or more users (for example users of the three PS3s 2031, 2032 and 2033) manoeuvre their avatars so as to view or otherwise access the same streamed content, it is wasteful of bandwidth for the Home environment server to send each PS3 separate copies of the streamed media.

In an embodiment of the present invention, to address this waste the Home environment server notifies these PS3s that they are to form part of a peer-to-peer grouping. The server then assigns different portions of the data to different PS3s, together with the IP addresses of the relevant PS3s, and instructs them to share the data they receive from the Home environment server with the other PS3s in the group in a peer-to-peer fashion. In this way all the PS3s will receive the download efficiently as a mix of client/server and peer-to-peer data transfer, orchestrated by the Home environment (or content) server. The server can implement the notification, instruction and data transfers using known communications equipment and protocols.

Where the data is a download, these portions could for example be the first, second and last thirds of the data sent respectively to one of the three PS3s 2031, 2032 and 2033.

Where the data is a live stream, these portions could for example be every third frame, offset for each device, as seen in Table 1 below. In this case, optionally each PS3 would receive the same short initial segment of the stream to act as a frame buffer before the stream was divided between the PS3s, so as to allow time for forwarding frames in a peer-to-peer fashion.

TABLE 1

Example frame sequence for the case of three PS3s

| PS3 | Frame |
|---|---|
| 2031 | 1 |
| 2032 | 2 |
| 2033 | 3 |
| 2031 | 4 |
| 2032 | 5 |
| 2033 | 6 |
| 2031 | 7 |
| 2032 | 8 |
| 2033 | 9 |
| 2031 | 10 |
| 2032 | 11 |
| 2033 | 12 |

In an embodiment of the present invention, data is assigned in a non-overlapping fashion. This may be done where there is sufficient time (e.g. due to buffering or where the transfer is not time-critical) to recover from the event that one or more PS3s disconnect from the Home server. Alternatively, the data may be assigned in an overlapping manner to provide redundancy in the event that one peer data source disconnects unexpectedly. Table 2 below shows an example of such redundancy for three PS3s, to cope with any one of them unexpectedly disconnecting.

In a simple embodiment, each peer member automatically distributes the redundant data it receives from the server so that redundancy is provided as a matter of course. Alternatively, the redundant part of the data could be identified as such and only transmitted if one or more peer members request it. In the case seen below in Table 2 for example, first PS3 2031 may request frame 2 from third PS3 2033 if second PS3 2032 fails to transmit it. Such requests may be given a high priority on the assumption that the request is made when it has been determined that the frame data is late and therefore required more urgently in order to be displayed in time.

TABLE 2

Example frame sequence with redundancy for the case of three PS3s

| PS3 | Frame |
|---|---|
| 2031 | 1 |
| 2032 | 2, 1 |
| 2033 | 3, 2 |
| 2031 | 4, 3 |
| 2032 | 5, 4 |
| 2033 | 6, 5 |
| 2031 | 7, 6 |
| 2032 | 8, 7 |
| 2033 | 9, 8 |
| 2031 | 10, 9 |

TABLE 2-continued

Example frame sequence with redundancy for the case of three PS3s

| PS3 | Frame |
|---|---|
| 2032 | 11, 10 |
| 2033 | 12, 11 |

In the case where one PS3 disconnects, the data is redistributed among the remaining devices. In the above case with redundancy, this devolves to two separate streams from the Home environment server, but it will be appreciated that where more PS3s are initially included in the group, it would merely result in a proportionate increase in data load. Clearly, therefore, the efficiencies gained by this scheme increase as more PS3s are included within the peer group. The membership can increase or decrease dynamically depending on the behaviour of the avatars within the Home environment, which is monitored and updated by the Home environment server in an ongoing fashion.

By apportioning the data in this way, all PS3s in the group receive the full set of data, whilst no single PS3 receives the full set of data from the server only.

Data may also be distributed differently between the PS3s for other reasons. In an embodiment of the present invention, the data transmission rates of each PS3 in the peer group are monitored by the Home environment server, which adapts the apportionment of data it sends to each so as to increase the data load for PS3s with faster transmission rates. Such adaptive loading increases the overall efficiency of the peer group and reduces the chance of lost frames in time critical streaming applications, by reducing the contribution of slower peer group members. Typically, each PS3 monitors its own transmission rates to each peer and transmits a mean rate back to the server.

Peer groups can be determined in a number of ways with respect to the virtual environment.

Figure 11A:
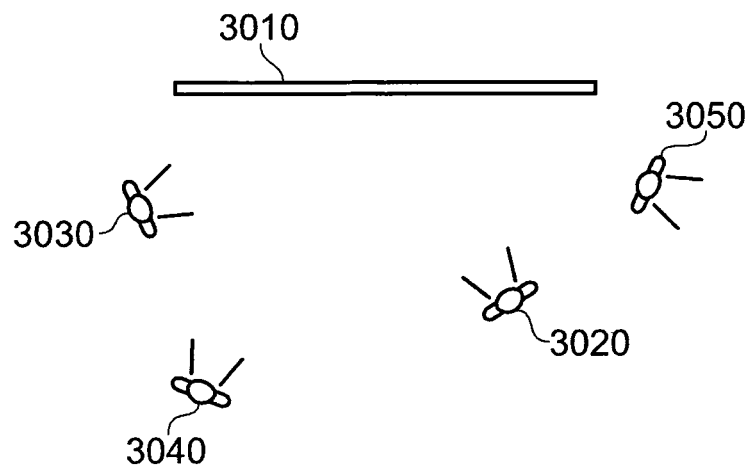
FIG. 11 is a schematic diagram of part of an instance of an on-line virtual environment.
Figure 11B:
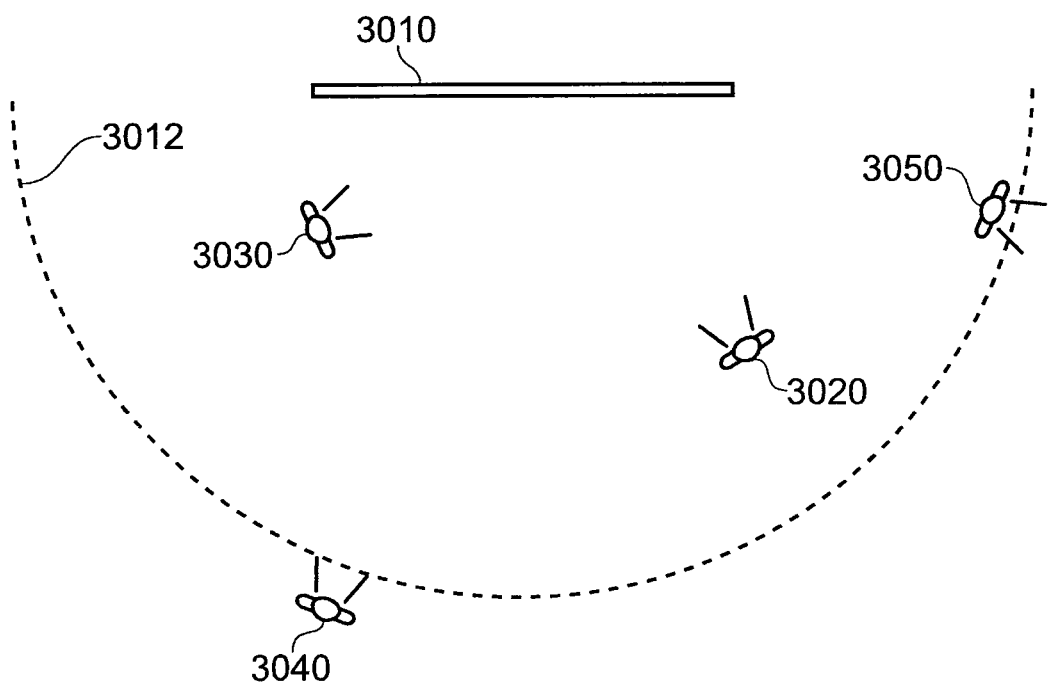

FIGS. 11A and 11B show a notional plan view of a portion of the Home environment comprising a screen 3010 and avatars 3020, 3030, 3040 and 3050. The screen may be similar to the cinema screen 1012 or 1022 as seen in FIGS. 6a and 6c, or may be a virtual television screen or of some other suitable form for presenting video and/or audio, such as those seen in FIG. 8a.

In FIG. 11A, membership of the peer group with respect to the streaming data being transmitted for display on screen 3010 is dependent upon whether the avatar is positioned so that the screen 3010 is visible to the user of each potential peer device. In the example of FIG. 11A, the PS3s corresponding to the first avatar 3020, second avatar 3030 and third avatar 3040 will be members of the peer group between which the streamed content is apportioned, whilst the PS3 corresponding to the fourth avatar 3050 that is facing away from the screen will not be part of the group.

In FIG. 11B, membership of the peer group with respect to the streaming data being downloaded for display on screen 3010 is dependent on the distance of each avatar from the screen, irrespective of whether the screen is currently visible to the avatar's user. In this scheme, a radius 3012 is an effective activation or draw distance, for which the streaming data is not sent to PS3s whose avatars are beyond this distance (or alternatively, a much lower resolution, and thus data rate, version is sent). Thus, for example, the PS3 corresponding to the fourth avatar 3050 is part of the peer group even though currently the streaming content is not visible to its user. However, if the user was to manoeuvre this avatar so that the viewpoint encompassed the screen, they would find the streaming content immediately visible; this would conform with most user's expectations of a nearby screen. By contrast, the PS3 corresponding to the third avatar 3040 is not part of the peer group because of its distance from the screen, even though the screen is within the field of view displayed to the user.

The schemes of FIGS. 11A and B can be combined in several ways. For example, the radius 3012 can be made to only apply when a user's viewpoint does not encompass the screen 3010; in this case, in FIG. 11B the PS3 corresponding to the third avatar 3040 is also included in the peer group, despite being outside the activation radius, because the resulting field of view encompasses the screen; on the other hand, if this avatar was facing the other way such that the resulting field of view did not encompass the screen, the corresponding PS3 would not be part of the peer group.

Optionally, a second radius (not shown) could act as a further cut-off point for avatars, beyond which their corresponding PS3s are not part of the peer group irrespective of whether the displayed field of view encompasses the screen 3010. This avoids the possibility of many other users with distant avatars briefly joining and leaving the group, thereby making reliable assignment of data difficult.

Where it is likely that all users in a zone of the Home environment will see a screen or receive a download, then potentially all corresponding PS3s can be made members of a peer group.

As noted previously, the efficiency of the peer groups improves with size, at least whilst the payload data is a significantly larger part of the overall data than the overhead data (such as messaging and packet address data).

Therefore, in an embodiment of the present invention, the group of avatars viewing or near to a streaming video screen as seen in FIGS. 11A and B and the above variations is not limited to a single instance of the Home environment. Instead, parallel instances of the Home environment in which other users are viewing parallel instances of the same screen can be considered part of the same peer group for the purposes of distributing the streamed data.

Thus for example, the first three avatars 3020, 3030 and 3040 of FIG. 11A could be joined in a peer group by other avatars (not shown) 3020', 3030', 3040', 3020'', 3030'' and 3040'' corresponding to other users in other instances of the Home environment who have happened to manoeuvre their avatars to view parallel instances of the same screen at the same time.

The Home environment server, supporting multiple instances of the Home environment, determines whether PS3s connected to different instances of the Home environment require, within their own instances, the same streamed data, and so should form a peer group in the manner described above.

The Home environment server can thus amalgamate peer groups from different instances of the Home environment to achieve a larger, more efficient peer group, for example joining groups together until a target number of PS3s in the overall peer group is met or exceeded. For example, the target number could be defined as n where (total current data bandwidth or amount/n)>(m×overhead per peer member), and m is, for example, 5. The Home environment server optionally can recruit and remove peers from a group dynamically to meet this criterion—for example, when a high data rate film cuts to a low data rate advert, it may be more efficient to break a large peer group into smaller groups to maintain the data/overhead ratio, and then re-amalgamate the peer groups when the high data rate film resumes.

Optionally, these parallel instances can be selected according to other criteria, such as geographical proximity of the PS3s in the respective instances (derived, for example, from registration data or from IP addresses). Alternatively or in addition, members of different groups can be instructed to send test packets to members of other groups and report the results back to the Home Environment server, which then determines the fastest combination of PS3s that could form a peer group.

Thus, for example, where the PS3 corresponding to the first avatar 3020 in FIG. 11A actually has a slow peer-to-peer connection with the PS3s corresponding to the second and third avatars 3030 and 3040, but has much faster peer-to-peer connections with avatars 3020' and 3020" from parallel instances of the Home environment who are also streaming the data, then the peer group that is formed may comprise the first avatar 3020, and the parallel avatars 3020', and 3020" rather than the first, second and third avatars 3020, 3030 and 3040 in the same instance of the Home environment.

In an embodiment of the present invention, PS3s corresponding to, for example, the first, second and third avatars 3020, 3030 and 3040 have all acquired some or all of a download already. A single, fourth PS3 corresponding to fourth avatar 3050 connects to the Home Environment server and also requires the data to be downloaded. In this case, the server and peer devices cooperate to transfer the data to the fourth PS3; the server begins transmitting data from the start of the data download toward the middle of the data set, whilst one or more of the peer group begin transmitting data from the end of the data download (or vice versa) towards the middle of the data set. This combined process completes where the server data transfer and the peer data transfer reach the same position in the data. The transfer process is thus self-regulating as whichever of the two methods is fastest will provide the greater part of the transfer.

Clearly, rather than simply starting at opposite ends of the data and filling-in until they meet up in the middle, other data patterns could be used, but again the server would start at one end of the pattern, the peer group at the other, and each would continue until they reached a point where the other had already supplied the data. Clearly if the server or peer group failed for some reason, the other system would provide the vast majority (or all) of the data by itself. Potentially, either the server or the peer group (but more typically the server) can provide the data on its own if necessary.

It will be appreciated that the above schemes are not limited to video streaming. For example, the same approach can be applied to audio streaming or an audio/video combination, as well as more general data downloads, for example additional 3D models, textures and control software for third party zones or subsections of such zones when a user guides their avatar into them.

Similarly, it will be appreciated that the above schemes are not limited to viewing or being close to a video screen or other virtual item. For example, other criteria for triggering the formation of or joining in a peer group may include entry into a particular zone, interaction with a particular virtual device or interaction with another avatar, where such entry or interaction results in the need to acquire data online.

Likewise, it will be appreciated that the above schemes are not limited to avatars in the Home environment, but more generally enable the coordinated download of data from and controlled by a server source. This is particularly, but not exclusively, applicable to the case of streamed data such as media data.

Figure 12:
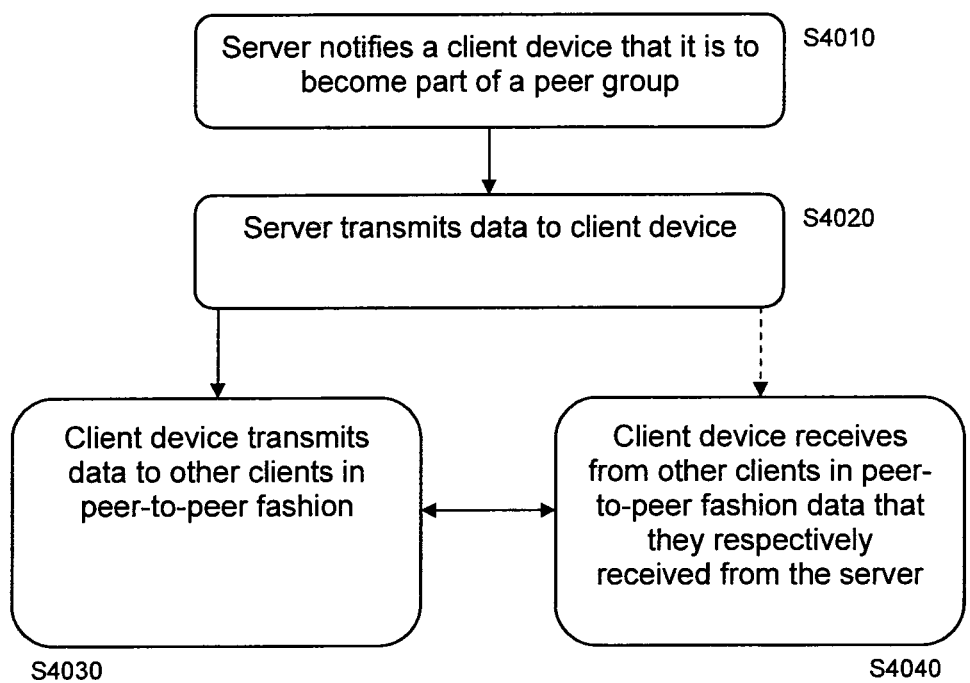
FIG. 12 is a flow diagram of a method of data transfer in accordance with an embodiment of the present invention.

Referring now also to FIG. 12, a corresponding method of data transfer comprises a first step s4010 of the server notifying a client device that it is to become a member of a peer-group of client devices, followed by a second step s4020 of server transmitting data to the client device. In a third step s4030, the client device transmits data it receives from the server to other client devices in the peer group in a peer-to-peer fashion, whilst in a fourth step s4040 the client device also receives from other client devices in the peer group in a peer-to-peer fashion data that each respective client device in the peer group has received from the server.

It will be apparent to a person skilled in the art that variations in the above method corresponding to operation of the various embodiments of the apparatus disclosed herein are considered to be within the scope of the present invention, including but not limited to:

- the server sending complementary or redundant data to the peers;
- the server sending streamed data;
- the server sending such streamed data as interleaved frames shared between the peer group;
- the server monitoring peer transmission speeds and apportioning data accordingly;
- the server hosting one or more instances of an on-line virtual environment;
- the client devices being represented by avatars within one or more instances of an on-line virtual environment; and
- the server selecting devices for membership of a peer group according to behaviours of their avatars.

It will be appreciated that embodiments of the present invention may be implemented by reprogramming of one or more processors within the server and/or PS3s. As such, the required adaptation may be implemented in the form of a computer program product comprising processors implementable instructions stored on a data carrier such as a floppy disk, optical disk, hard disk, PROM, RAM, flash memory or any combination of these or other storage media, or transmitted via data signal on a network such as an Ethernet, a wireless network, the Internet, or any combination of these or other networks.

The invention claimed is:

1. A data transfer system comprising:
a server; and
a plurality of devices each operable as a client of the server and as a peer-to-peer device;
the server comprising:
a data allocator,
a notification arrangement to notify the plurality of devices that they are to form a peer group; and
a client/server data transmitter to send data to the respective devices upon such notification;
each device comprising:
a client/server data receiver to receive respective data from the server;
a peer-to-peer communicator to send the respective data received from the server to one or more peers, and to receive from one or more peers the respective data that was sent to it or them by the server; and
a peer-to-peer transmission rate detector;
in which the allocation of data from the data allocator of the server to one or more clients is responsive to their respective current peer-to-peer transmission rate such that the data allocation is increased for clients having faster peer-to-peer transmission rates; and
in which membership in the peer group increases or decreases dynamically depending on behavior of the one or more clients, the membership being monitored and updated by the server in an ongoing fashion.

2. A data transfer system according to claim 1, in which the respective data received from the server is non-overlapping across the peer group.

3. A data transfer system according to claim 1, in which the respective data received from the server comprises redundant data across the peer group, so that at least some of the data is sent by the server to two or more devices.

4. A data transfer system according to any one of the preceding claims, in which the respective data received from the server comprises data representing a media stream.

5. A data transfer system according to claim 4, in which the respective data comprises non-adjacent video frames.

6. A data transfer system according to claim 1, in which the devices are connected to one or more instances of an on-line virtual environment and represented within the online virtual environment by avatars.

7. A data transfer system according to claim 6, in which the server is operable to select devices for membership of the peer group by the server according to the behaviour of their avatar within the on-line virtual environment.

8. A data transfer system according to claim 6 or claim 7 in which devices are selected for membership of the peer group by the server according to one or more criteria selected from the list consisting of:
  i. a location of their avatar being within a region of the on-line virtual environment relative to a virtual object;
  ii. a viewpoint of the on-line virtual environment resulting from the orientation of the avatar;
  iii. the location of their avatar being within a region of the on-line virtual environment;
  iv. interaction of their avatar with a virtual object; and
  v. the interaction of their avatar with another avatar.

9. A data transfer system according to claim 1, in which each client is a games console.

10. A server comprising:
  a notification arrangement to notify a plurality of devices that they are to form a peer group;
  a client/server data transmitter to send data to the respective devices upon such notification;
  a peer-to-peer transmission rate detector; and
  a data allocator,
  in which the allocation of data from the data allocator of the server to one or more of the plurality of devices is responsive to their respective current peer-to-peer transmission rate such that the data allocation is increased for clients having faster peer-to-peer transmission rates; and
  in which membership in the peer group increases or decreases dynamically depending on behavior of the one or more devices, the membership being monitored and updated by the server in an ongoing fashion.

11. A server according to claim 10, further comprising:
  a peer device transmission rate monitor; and
  a client/server data transmission adjuster, in which
  data is apportioned to clients within the peer group responsive to their transmission rates.

12. A server according to claim 11 or claim 11, wherein the server is operable to host multiple instances of a virtual environment.

13. A server according to claim 12, wherein the server is operable to notify a device that it is to become a peer group comprising other clients of the server in response to the behaviour of an avatar corresponding to the device within an instance of the virtual environment.

14. A device operable as a client in a client/server communications system, comprising:
  a client/server data receiver to receive data from a server; and
  a peer-to-peer communicator to send the data received from the server to one or more peers, and to receive from one or more peers respective data that was sent to it or them by the server; and in which
  the device is operable to receive notification from the server that it is to form a peer-group comprising other clients of the server and to distribute data sent by the server to the peer group;
  in which allocation of data between the server and the client and between the server and one or more of the other clients is responsive to their respective current peer-to-peer transmission rate such that the data allocation is increased by the server for clients having faster peer-to-peer transmission rates; and
  in which membership in the peer-group is increased or decreased dynamically depending on behavior of the clients, the membership being monitored and updated by the server in an ongoing fashion.

15. A device according to claim 14, further comprising:
  a virtual environment renderer; and in which
  the device is operable to connect to an instance of a virtual environment hosted on-line by a server.

16. A device according to claim 14 or 15, comprising a peer-to-peer data transmission rate feedback arrangement to send data transmission rate information back to the server.

17. A device according to claim 14, in which the device is a games console.

18. A data transfer system comprising:
  a server;
  a plurality of devices each operable as a client of the server and as a peer-to-peer device, and operable to form a peer-to-peer group;
  the server comprising:
  a request receiver to receive a request for data from a further device acting as a client device;
  a notification arrangement to notify the plurality of devices and the further device that they are to form a peer group; and
  a client/server data transmitter to send data to the further device;
  the further device comprising:
  a client/server data receiver to receive data from the server; and
  a peer-to-peer communicator to receive data from one or more peers in the peer group; and in which
  the server and one or more peers are arranged to transmit the requested data to the further device in parallel in a complementary fashion until a complete set of data is obtained by the further device, respective proportions of data being received by the further device from the server and the one or more peers being a consequence of their respective current data transfer rates such that the server increases data allocation for peers having faster peer-to-peer transmission rates; and
  in which membership in the peer group increases or decreases dynamically depending on behavior of the peers, the membership being monitored and updated by the server in an ongoing fashion.

19. A method of data transmission between a server and a plurality of client devices, the method comprising the steps of:
  the server notifying the plurality of client devices that they are to form a peer-group of client devices;
  the server transmitting data to a first client device;
  the first client device transmitting the data it receives from the server to other client devices in the peer group in a peer-to-peer fashion; and the first client device respectively receiving from other client devices in the peer group in a peer-to-peer fashion data that each respective client device in the peer group has received from the server, in which allocation of data from the server to one or more of the plurality of client devices is responsive to their respective peer-to-peer transmission rate such that the data allocation is increased for client devices having faster peer-to-peer transmission rates; and in which the server monitors and updates membership in the peer group dynamically depending on behavior of the one or more client devices.

20. A method of data transmission according to claim 19, in which the respective data received from the server is non-overlapping across the peer group.

21. A method of data transmission according to claim 19, in which the respective data received from the server comprises redundant data across the peer group, so that at least some of the data is sent by the server to two or more client devices.

22. A method of data transmission according to any one of claims 19 to 21, in which the respective data received from the server comprises data representing a media stream.

23. A method of data transmission according to claim 22, in which the respective data comprises non-adjacent video frames.

24. A method of data transmission according to claim 19, further comprising the step of:
apportioning data from the server to one or more of the client devices responsive to their respective peer-to-peer transmission rate.

25. A method of data transmission according to claim 19, further comprising the steps of:
connecting the client devices to one or more respective instances of an on-line virtual environment; and
representing the client devices within the or each respective instance of the on-line virtual environment by avatars.

26. A method of data transmission according to claim 25, further comprising the step of:
the server selecting a given client device for membership of the peer group according to the behaviour of their avatar within the on-line virtual environment.

27. A method of data transmission according to claim 25, further comprising the step of:
the server selecting a given client device for membership of the peer group according to the behaviour of their avatar within the on-line virtual environment corresponding to one or more criteria selected from the list consisting of:
i. a location of their avatar being within a region of the on-line virtual environment relative to a virtual object;
ii. a viewpoint of the on-line virtual environment resulting from the orientation of the avatar;
iii. the location of their avatar being within a region of the on-line virtual environment;
iv. interaction of their avatar with a virtual object; and
v. the interaction of their avatar with another avatar.

28. A method of data transmission from a server to a further device and a plurality of devices forming a peer group, the method comprising the steps of:
the server receiving a request for data from the further device;
the server notifying the plurality of devices and the further device that they are to form a peer group;
the server transmitting the data to the further device;
one or more other devices of the peer group receiving a request to transmit the data to the further device;
the one or more other devices of the peer group transmitting the data to the further device;
and in which
the server and the one or more other devices of the peer group transmit the requested data to the further device in parallel in a complementary fashion until a complete set of data is obtained by the further device, respective proportions of the requested data being received by the further device from the server and the one or more other devices of the peer group being a consequence of their current respective data transfer rates such that the data transmission is increased to the further device from selected ones of the one or more other devices having faster peer-to-peer transmission rates; and
in which membership in the peer group increases or decreases dynamically depending on behavior of the plurality of devices, the membership being monitored and updated by the server in an ongoing fashion.

29. A non-transitory computer-readable medium having instructions stored thereon, the instructions, when executed by a processor, cause the processor to perform a method of data transmission to a further device from a server and a plurality of devices forming a peer group, the method comprising the steps of:
the server receiving a request for data from the further device;
the server notifying the plurality of devices and the further device that they are to form a peer group;
the server transmitting the data to the further device;
one or more other devices of the peer group receiving a request to transmit the data to the further device;
the one or more other devices of the peer group transmitting the data to the further device;
and in which
the server and the one or more other devices of the peer group transmit the requested data to the further device in parallel in a complementary fashion until a complete set of data is obtained by the further device, respective proportions of the requested data being received by the further device from the server and the one or more other devices of the peer group being a consequence of their respective current data transfer rates such that the data transmission is increased to the further device from selected ones of the one or more other devices having faster peer-to-peer transmission rates; and
in which membership in the peer group increases or decreases dynamically depending on behavior of the plurality of devices, the membership being monitored and updated by the server in an ongoing fashion.

30. A non-transitory computer-readable medium having instructions stored thereon, the instructions, when executed by a processor, cause the processor to perform a method of data transmission between a server and a plurality of client devices, the method comprising:
the server notifying the plurality of client devices that they are to form a peer-group of client devices;
the server transmitting data to a first client device;
the first client device transmitting the data it receives from the server to other client devices in the peer group in a peer-to-peer fashion; and
the first client device respectively receiving from other client devices in the peer group in a peer-to-peer fashion data that each respective client device in the peer group has received from the server,
in which allocation of data from the server to one or more of the plurality of client devices is responsive to their respective peer-to-peer transmission rate such that the data allocation is increased for client devices having faster peer-to-peer transmission rates; and in which the server monitors and updates membership in the peer group dynamically depending on behavior of the one or more client devices.

* * * * *